United States Patent
Nishi

(10) Patent No.: US 12,065,808 B2
(45) Date of Patent: Aug. 20, 2024

(54) SHOVEL, DISPLAY DEVICE FOR SHOVEL, AND DISPLAY METHOD FOR SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 623 days.

(21) Appl. No.: 16/776,957

(22) Filed: Jan. 30, 2020

(65) Prior Publication Data
US 2020/0165798 A1 May 28, 2020

Related U.S. Application Data

(63) Continuation of application No. PCT/JP2018/029622, filed on Aug. 7, 2018.

(30) Foreign Application Priority Data

Aug. 9, 2017 (JP) .................................. 2017-154061

(51) Int. Cl.
E02F 9/26 (2006.01)
E02F 9/20 (2006.01)
H04N 7/18 (2006.01)

(52) U.S. Cl.
CPC .............. *E02F 9/261* (2013.01); *E02F 9/264* (2013.01); *H04N 7/181* (2013.01); *E02F 9/2004* (2013.01)

(58) Field of Classification Search
CPC ......... E02F 9/261; E02F 9/264; E02F 9/2004; E02F 3/435; E02F 9/26; H04N 7/181; H04N 7/18
See application file for complete search history.

(56) References Cited

U.S. PATENT DOCUMENTS

| 2014/0064897 A1* | 3/2014 | Montgomery | E02F 9/265 414/815 |
| 2014/0099178 A1* | 4/2014 | Nomura | E02F 9/26 414/685 |
| 2015/0149049 A1 | 5/2015 | Bewley et al. | |
| 2015/0160804 A1* | 6/2015 | Fujimoto | H04N 21/4858 715/811 |

(Continued)

FOREIGN PATENT DOCUMENTS

| DE | 112012000296 | 8/2014 |
| JP | 2012-233404 | 11/2012 |

(Continued)

OTHER PUBLICATIONS

International Search Report for PCT/JP2018/029622 mailed on Sep. 25, 2018.

*Primary Examiner* — Richard A Hansell, Jr.
(74) *Attorney, Agent, or Firm* — IPUSA, PLLC

(57) ABSTRACT

A shovel includes a lower traveling body, an upper turning body turnably mounted on the lower traveling body, a cab mounted on the upper turning body, an attachment attached to the upper turning body, and a display device provided in the cab. The display device is configured to display an image including a first graphic and a second graphic. The first graphic represents the relative relationship between the working part of the attachment and a target work surface. The second graphic changes according to the movement of the working part.

16 Claims, 12 Drawing Sheets

(56) References Cited

U.S. PATENT DOCUMENTS

| | | | |
|---|---|---|---|
| 2015/0218781 A1* | 8/2015 | Nomura | E02F 3/435 |
| | | | 345/589 |
| 2015/0345114 A1* | 12/2015 | Nomura | E02F 5/025 |
| | | | 37/379 |
| 2016/0010312 A1* | 1/2016 | Kurihara | E02F 9/261 |
| | | | 701/36 |
| 2016/0024757 A1* | 1/2016 | Nomura | E02F 9/2054 |
| | | | 701/32.3 |
| 2017/0089042 A1* | 3/2017 | Machida | B60R 1/28 |
| 2017/0114526 A1* | 4/2017 | Yasuda | E02F 9/264 |
| 2017/0175362 A1* | 6/2017 | Iwanaga | G01S 19/43 |
| 2018/0030694 A1* | 2/2018 | Kanari | E02F 9/264 |
| 2018/0094408 A1* | 4/2018 | Shintani | E02F 9/26 |
| 2018/0167588 A1 | 6/2018 | Izumikawa et al. | |
| 2018/0202130 A1 | 7/2018 | Morimoto | |
| 2018/0340316 A1* | 11/2018 | Izumikawa | E02F 9/26 |
| 2019/0360179 A1* | 11/2019 | Moriki | E02F 3/43 |
| 2020/0141091 A1* | 5/2020 | Narikawa | E02F 3/435 |
| 2022/0268000 A1* | 8/2022 | Song | E02F 9/261 |

FOREIGN PATENT DOCUMENTS

| | | | | |
|---|---|---|---|---|
| JP | 2012-255286 | | 12/2012 | |
| JP | 2014-205955 | | 10/2014 | |
| JP | 2016-204840 | | 12/2016 | |
| WO | WO-2016158539 A1 * | 10/2016 | | E02F 9/20 |
| WO | 2017/026469 | | 2/2017 | |
| WO | 2017/047654 | | 3/2017 | |
| WO | WO-2018179596 A1 * | 10/2018 | | E02F 3/43 |

\* cited by examiner

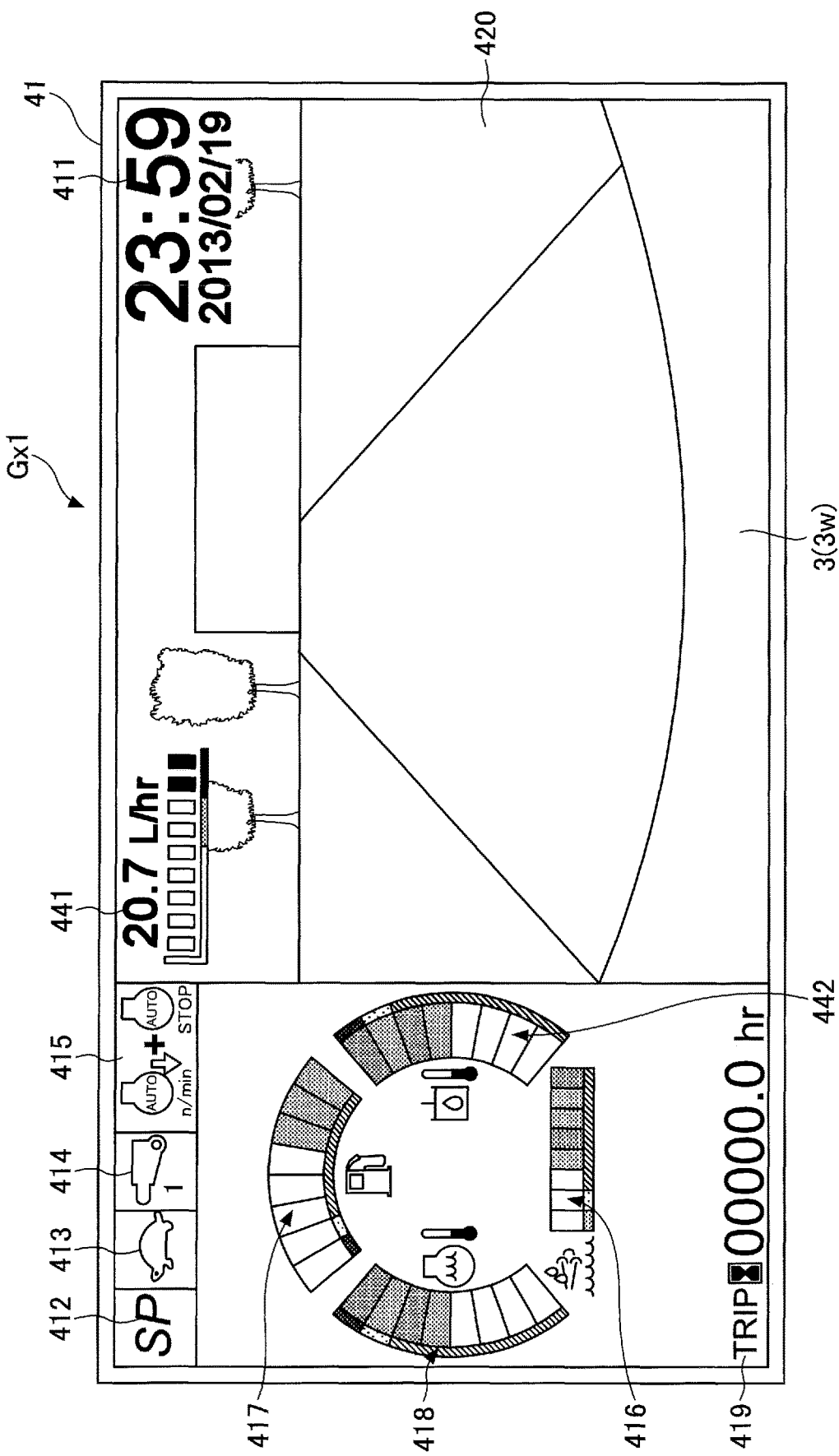

SHOVEL, DISPLAY DEVICE FOR SHOVEL, AND DISPLAY METHOD FOR SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/029622, filed on Aug. 7, 2018 and designating the U.S., which claims priority to Japanese patent application No. 2017-154061, filed on Aug. 9, 2017. The entire contents of the foregoing applications are incorporated herein by reference.

BACKGROUND

Technical Field

The present invention relates to shovels, display devices for shovels, and display methods for shovels.

Description of Related Art

Shovels with a function of providing guidance on shovel operations (hereinafter, "machine guidance function") have been known. According to shovels with the machine guidance function, for example, information on work condition, etc., is displayed on the screen of a display device installed in front of an operator seat.

The information on work condition, etc., includes an image that schematically shows the relationship between a bucket and a target work surface. For example, a bucket and a target work surface as viewed by an operator seated in a cabin and looking forward from a shovel are schematically shown as a bucket icon and a target work surface in this image. Furthermore, for example, the bucket and the target work surface as viewed from the side are schematically shown as a bucket icon and a target work surface in this image.

The operator can check the condition of work by the shovel including the positional relationship between the bucket and the target work surface, the inclination angle of the target work surface, etc., by looking at the image, etc., displayed on the display device.

SUMMARY

According to an aspect of the present invention, a shovel includes a lower traveling body, an upper turning body turnably mounted on the lower traveling body, a cab mounted on the upper turning body, an attachment attached to the upper turning body, and a display device provided in the cab. The display device is configured to display an image including a first graphic and a second graphic. The first graphic represents the relative relationship between the working part of the attachment and a target work surface. The second graphic changes according to the movement of the working part.

BRIEF DESCRIPTION OF THE DRAWINGS

FIG. 9 is a diagram illustrating an example layout of an output image displayed on a display device during a measurement mode.

DETAILED DESCRIPTION

Figure 1:
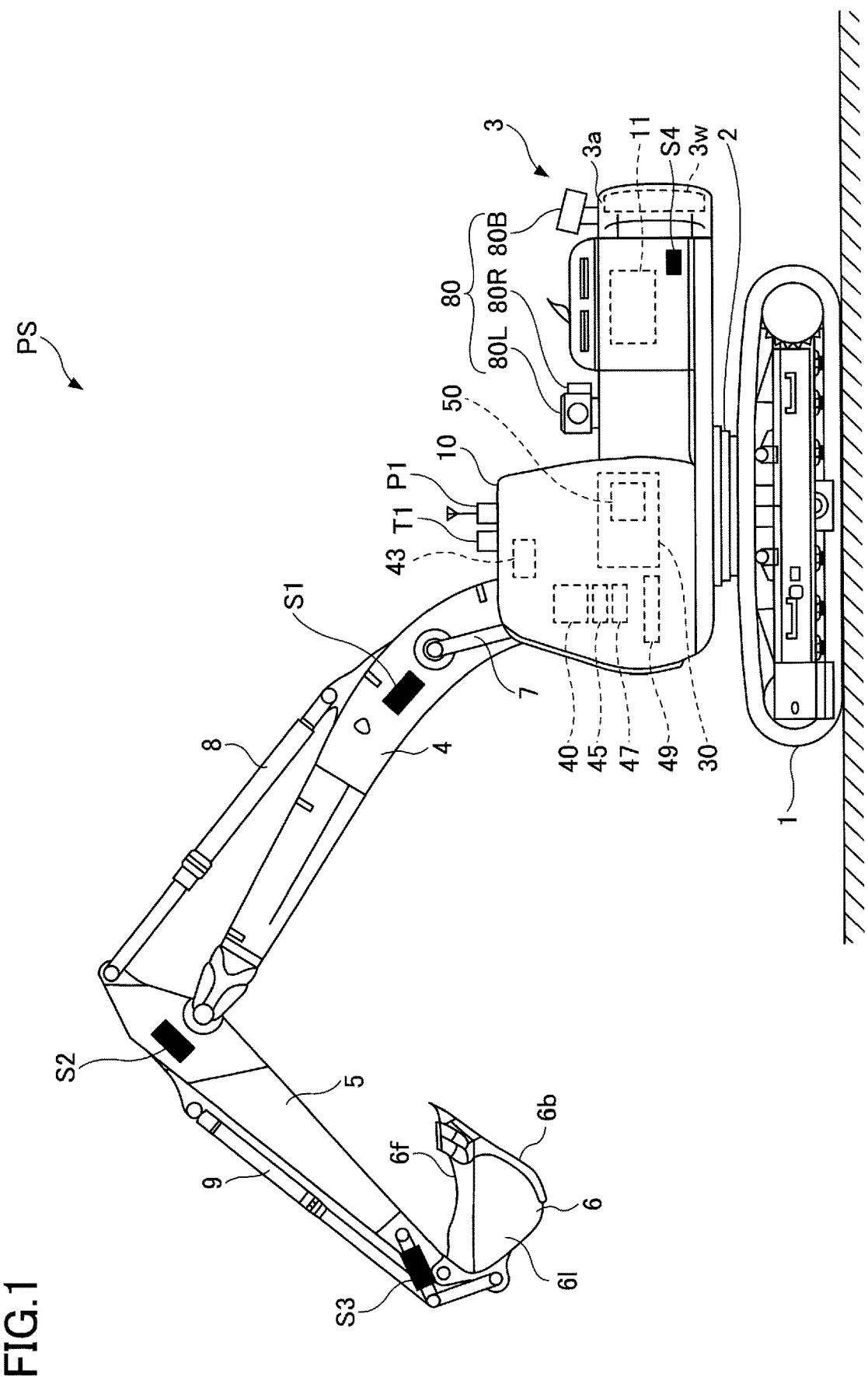
FIG. 1 is a side view of a shovel according to an embodiment of the present invention.

According to the above-described shovels, however, the movement of the bucket during operation causes no significant change in the image. Therefore, it is difficult for the operator to readily determine whether the bucket is in motion.

According to an embodiment of the present invention, a shovel that can improve the visibility of the movement of a working part is provided.

An embodiment of the present invention is described below with reference to the drawings. In the drawings, the same component parts are given the same reference numerals, and duplicate description thereof may be omitted.

First, the overall configuration of a shovel according to the embodiment of the present invention is described with reference to FIG. 1. FIG. 1 is a side view of the shovel according to the embodiment of the present invention.

An upper turning body 3 is turnably mounted on a lower traveling body 1 of a shovel PS via a turning mechanism 2. A boom 4 is attached to the upper turning body 3. An arm 5 is attached to the end of the boom 4. A bucket 6 serving as an end attachment (working part) is attached to the end of the arm 5. A slope bucket, a dredging bucket, a breaker or the like may alternatively be attached as an end attachment.

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment. The boom angle sensor S1, the arm angle sensor S2, and the bucket angle sensor S3 may be referred to as "posture sensors."

The boom angle sensor S1 detects the rotation angle of the boom 4. For example, the boom angle sensor S1 is an acceleration sensor that detects the rotation angle of the boom 4 relative to the upper turning body 3 by detecting an inclination to a horizontal plane.

The arm angle sensor S2 detects the rotation angle of the arm 5. For example, the arm angle sensor S2 is an acceleration sensor that detects the rotation angle of the arm 5 relative to the boom 4 by detecting an inclination to a horizontal plane.

The bucket angle sensor S3 detects the rotation angle of the bucket 6. For example, the bucket angle sensor S3 is an acceleration sensor that detects the rotation angle of the bucket 6 relative to the arm 5 by detecting an inclination to a horizontal plane.

When the excavation attachment is provided with a bucket tilt mechanism, the bucket angle sensor S3 additionally detects the rotation angle of the bucket 6 about a tilt axis. The boom angle sensor S1, the arm angle sensor S2, and the bucket angle sensor S3 may alternatively be potentiometers using a variable resistor, stroke sensors that detect the stroke amount of a corresponding hydraulic cylinder, rotary encoders that detect a rotation angle about a link, or the like.

A power source such as an engine 11, a counterweight 3w, and a body tilt sensor S4 are mounted on the upper turning body 3 and covered with a cover 3a. The body tilt sensor S4 detects the tilt angle of the upper turning body 3. For example, the body tilt sensor S4 is an acceleration sensor that detects the tilt angle of the upper turning body 3 by detecting an inclination to a horizontal plane.

An image capturing device 80 is provided on top of the cover 3a of the upper turning body 3. The image capturing device 80 includes, facing a cabin 10 from the upper turning body 3, a left-side camera 80L that captures an image on the left side, a right-side camera 80R that captures an image on the right side, and a back-side camera 80B that captures an image on the back side. The left-side camera 80L, the right-side camera 80R, and the back-side camera 80B are, for example, digital cameras that contain an imaging device such as a CCD or CMOS, and transmit respective captured images to a display device 40 provided in the cabin 10.

The cabin 10, serving as a cab, is provided on the upper turning body 3. A GPS device (a GNSS receiver) P1 and a transmitter T1 are provided at the top of the cabin 10. The GPS device P1 detects the position of the shovel PS using a GPS function, and feeds position data to a machine guidance device 50 in a controller 30. The transmitter T1 transmits information to the outside of the shovel PS. The transmitter T1 transmits information to the outside of the shovel PS. The controller 30, the display device 40, an audio output device 43, an input device 45, and a storage device 47 are provided in the cabin 10.

The controller 30 operates as a main control part that controls the driving of the shovel PS. The controller 30 is composed of a processing unit including a CPU and an internal memory. The CPU executes a program stored in the internal memory to implement various functions of the controller 30. The controller 30 also operates as the machine guidance device 50 that guides operations of the shovel PS.

The machine guidance device 50 executes a machine guidance function to guide (direct) operations of the shovel PS. According to this embodiment, for example, the machine guidance device 50 provides an operator with work information such as the distance between a target work surface that is the surface of a target landform set by the operator and the working part of the attachment. The target work surface may be set according to a reference coordinate system. The reference coordinate system is, for example, the world geodetic system. The world geodetic system is a three-dimensional Cartesian coordinate system with the origin at the center of mass of the Earth, the X-axis oriented toward the point of intersection of the prime meridian and the equator, the Y-axis oriented toward 90 degrees east longitude, and the Z-axis oriented toward the Arctic pole. Alternatively, any point at a work site may be set as a reference point, and the target work surface may be set based on a relative positional relationship with the reference point. The distance between the target work surface and the working part of the attachment is, for example, the distance between the target work surface and the leading edge (teeth tips) of the bucket 6 serving as an end attachment, the back surface of the bucket 6, the end of a breaker serving as an end attachment, or the like. The machine guidance device 50 provides the operator with work information via the display device 40, the audio output device 43, etc., to guide operations of the shovel PS.

The machine guidance device 50 may execute a machine control function to automatically assist the operator in operating the shovel PS. For example, in the case of executing the machine control function, the machine guidance device 50 assists the operator in moving the boom 4, the arm 5, and the bucket 6 such that the leading edge position of the bucket 6 coincides with the target work surface during an excavating operation. More specifically, for example, during an arm closing operation by the operator, the machine guidance device 50 automatically extends or retracts at least one of the boom cylinder 7 and the bucket cylinder 9 to make the leading edge position of the bucket 6 coincide with the target work surface. In this case, only by operating a single operating lever, the operator can simultaneously move the boom 4, the arm 5, and the bucket 6 to perform excavation work while making the leading edge position of the bucket 6 coincide with the target work surface.

While the machine guidance device 50 is incorporated into the controller 30 according to this embodiment, the machine guidance device 50 and the controller 30 may be provided separately. In this case, like the controller 30, the machine guidance device 50 is composed of a processing unit including a CPU and an internal memory. The CPU executes a program stored in the internal memory to implement various functions of the machine guidance device 50.

The display device 40 displays an image including various kinds of work information in response to a command from the machine guidance device 50 included in the controller 30. The display device 40 is, for example, an in-vehicle liquid crystal display connected to the machine guidance device 50.

The audio output device 43 outputs various kinds of audio information in response to an audio output command from the machine guidance device 50 included in the controller 30. The audio output device 43 includes, for example, an in-vehicle loudspeaker connected to the machine guidance device 50. The audio output device 43 may include an alarm such as a buzzer.

The input device 45 is a device for inputting various kinds of information to the controller 30 including the machine guidance device 50 by the operator of the shovel PS. The input device 45 includes, for example, a membrane switch provided on the surface of the display device 40. The input device 45 may include a touchscreen or the like.

The storage device 47 is a device for storing various kinds of information. The storage device 47 is, for example, a non-volatile storage medium such as a semiconductor memory. The storage device 47 stores various kinds of information output by the controller 30 including the machine guidance device 50, etc.

A gate lock lever 49 is a mechanism provided between the door and the operator seat of the cabin 10 to prevent the shovel PS from being accidentally operated. When the operator gets onto the operator seat and pulls up the gate lock lever 49, the operator is prevented from getting out of the cabin 10 and various operating apparatuses are enabled. When the operator pushes down the gate lock lever 49, the operator can get out of the cabin 10 and various operating apparatuses are disabled.

Figure 2:
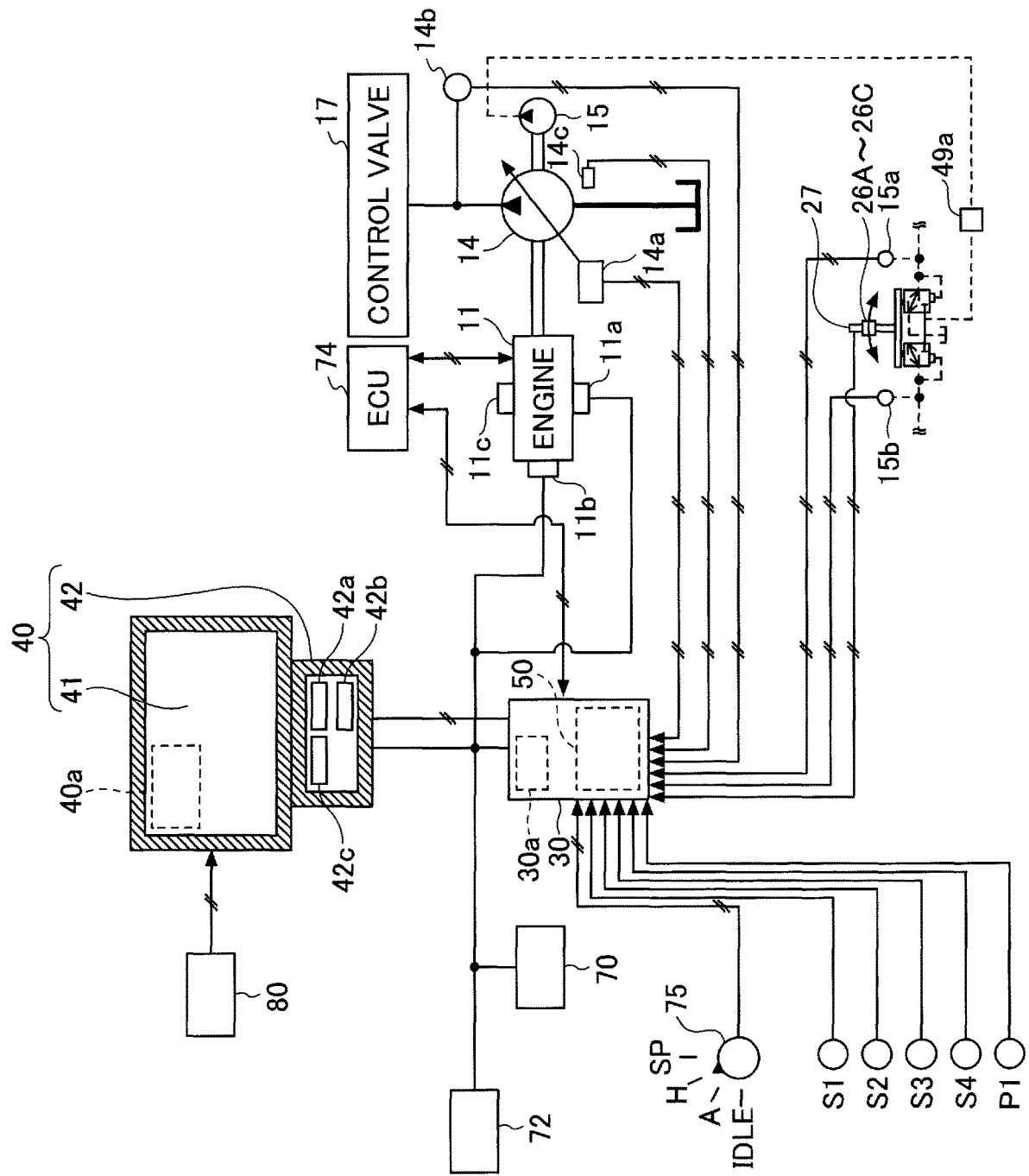
FIG. 2 is a diagram illustrating an example configuration of a drive control system of the shovel.

Next, an example configuration of the drive control system of the shovel PS is described with reference to FIG. 2. FIG. 2 is a diagram illustrating an example configuration of the drive control system of the shovel PS.

The display device 40 is provided in the cabin 10 to display an image including work information fed from the machine guidance device 50, etc. For example, the display device 40 is connected to the controller 30 including the machine guidance device 50 via a communications network such as a CAN (Controller Area Network) or a LIN (Local Interconnect Network), a dedicated line, or the like.

The display device 40 includes a conversion part 40a that generates an image to be displayed on an image display part 41. The conversion part 40a generates an image including a captured image to be displayed on the image display part 41, based on image data obtained from the image capturing device 80. Image data are input to the display device 40 from each of the left-side camera 80L, the right-side camera 80R, and the back-side camera 80B.

Furthermore, the conversion part 40a converts, into an image signal, data to be displayed on the image display part 41 among various kinds of data input to the display device 40 from the controller 30. The data input to the display device 40 from the controller 30 include, for example, data indicating the temperature of engine coolant water, data indicating the temperature of hydraulic oil, data indicating the remaining amount of an aqueous urea solution, and data indicating the remaining amount of fuel.

The conversion part 40a outputs the image signal after conversion to the image display part 41 to display an image generated based on a captured image and various kinds of data on the image display part 41.

The conversion part 40a may be provided in not the display device 40 but, for example, the controller 30. In this case, the image capturing device 80 is connected to the controller 30.

The display device 40 includes a switch panel 42 serving as an input part. The switch panel 42 is a panel including various kinds of hardware switches. The switch panel 42 includes a light switch 42a, a windshield wiper switch 42b, and a windshield washer switch 42c.

The light switch 42a is a switch for turning on and off lights attached to the exterior of the cabin 10. The windshield wiper switch 42b is a switch for moving and stopping a windshield wiper. The windshield washer switch 42c is a switch for spraying windshield washer fluid.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72, etc., of the shovel PS besides the controller 30 and the display device 40. Furthermore, a starter 11b of the engine 11 is driven with electric power from the rechargeable battery 70 to start the engine 11.

The engine 11 is connected to a main pump 14 and a pilot pump 15, and is controlled by an engine control unit (ECU) 74. Various data indicating the condition of the engine 11 (for example, data indicating coolant water temperature (a physical quantity) detected with a water temperature sensor 11c, etc.) are constantly transmitted from the ECU 74 to the controller 30. The controller 30 can store these data in an internal storage part 30a and suitably transmit the data to the display device 40.

The main pump 14 is a hydraulic pump for supplying hydraulic oil to a control valve 17 via a high-pressure hydraulic line. The main pump 14 is, for example, a swash-plate variable displacement hydraulic pump.

The pilot pump 15 is a hydraulic pump for supplying hydraulic oil to various hydraulic control apparatuses via a pilot line. The pilot pump 15 is, for example, a fixed displacement hydraulic pump.

The control valve 17 is a hydraulic controller that controls the hydraulic system of the shovel PS. For example, the control valve 17 selectively supplies hydraulic oil discharged by the main pump 14 to the boom cylinder 7, the arm cylinder 8, the bucket cylinder 9, traveling hydraulic motors, a turning hydraulic motor, etc. In the following, the boom cylinder 7, the arm cylinder 8, the bucket cylinder 9, the traveling hydraulic motors, and the turning hydraulic motor may be referred to as "hydraulic actuators."

Operating levers 26A through 26C are provided in the cabin 10 to be used by the operator to operate hydraulic actuators. When the operating levers 26A through 26C are operated, hydraulic oil is supplied from the pilot pump 15 to the pilot ports of flow control valves corresponding to hydraulic actuators. Each pilot port is supplied with hydraulic oil of a pressure commensurate with the direction of operation and the amount of operation of a corresponding one of the operating levers 26A through 26C.

According to this embodiment, the operating lever 26A is a boom operating lever. The operator can hydraulically drive the boom cylinder 7 to operate the boom 4 when operating the operating lever 26A. The operating lever 26B is an arm operating lever. The operator can hydraulically drive the arm cylinder 8 to operate the arm 5 when operating the operating lever 26B. The operating lever 26C is a bucket operating lever. The operator can hydraulically drive the bucket cylinder 9 to operate the bucket 6 when operating the operating lever 26C. Besides the operating levers 26A through 26C, operating levers, operating pedals, etc., for driving the traveling hydraulic motors, the turning hydraulic motor, etc., may be provided in the shovel PS.

The controller 30 obtains, for example, various kinds of data described below. The data obtained by the controller 30 are stored in the storage part 30a.

A regulator 14a of the main pump 14, which is a variable displacement hydraulic pump, transmits data indicating a swash plate angle to the controller 30. Furthermore, a discharge pressure sensor 14b transmits data indicating the discharge pressure of the main pump 14 to the controller 30. These data (data representing physical quantities) are stored in the storage part 30a. Furthermore, an oil temperature sensor 14c provided in a conduit between the main pump 14 and a tank storing hydraulic oil that the main pump 14 draws in transmits data representing the temperature of hydraulic oil flowing through the conduit to the controller 30.

Pressure sensors 15a and 15b detect a pilot pressure transmitted to the control valve 17 when the operating levers 26A through 26C are operated, and transmit data indicating the detected pilot pressure to the controller 30. The operating levers 26A through 26C are provided with a switch button 27. The operator can transmit a command signal to the controller 30 by operating the switch button 27 while operating the operating levers 26A through 26C.

An engine rotational speed adjustment dial 75 is provided in the cabin 10 of the shovel PS. The engine rotational speed adjustment dial 75 is a dial for adjusting the engine rotational speed, and, for example, can switch the engine rotational speed in a stepwise manner. According to this embodiment, the engine rotational speed adjustment dial 75 is provided to enable the engine rotational speed to be switched among the four levels of SP mode, H mode, A mode, and idling (IDLE) mode. The engine rotational speed adjustment dial 75 transmits data indicating the setting of the engine rotational speed to the controller 30. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel PS with low noise while prioritizing fuel efficiency, and uses the third highest engine rotational speed. The idling mode is a rotational speed mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

Figure 3:
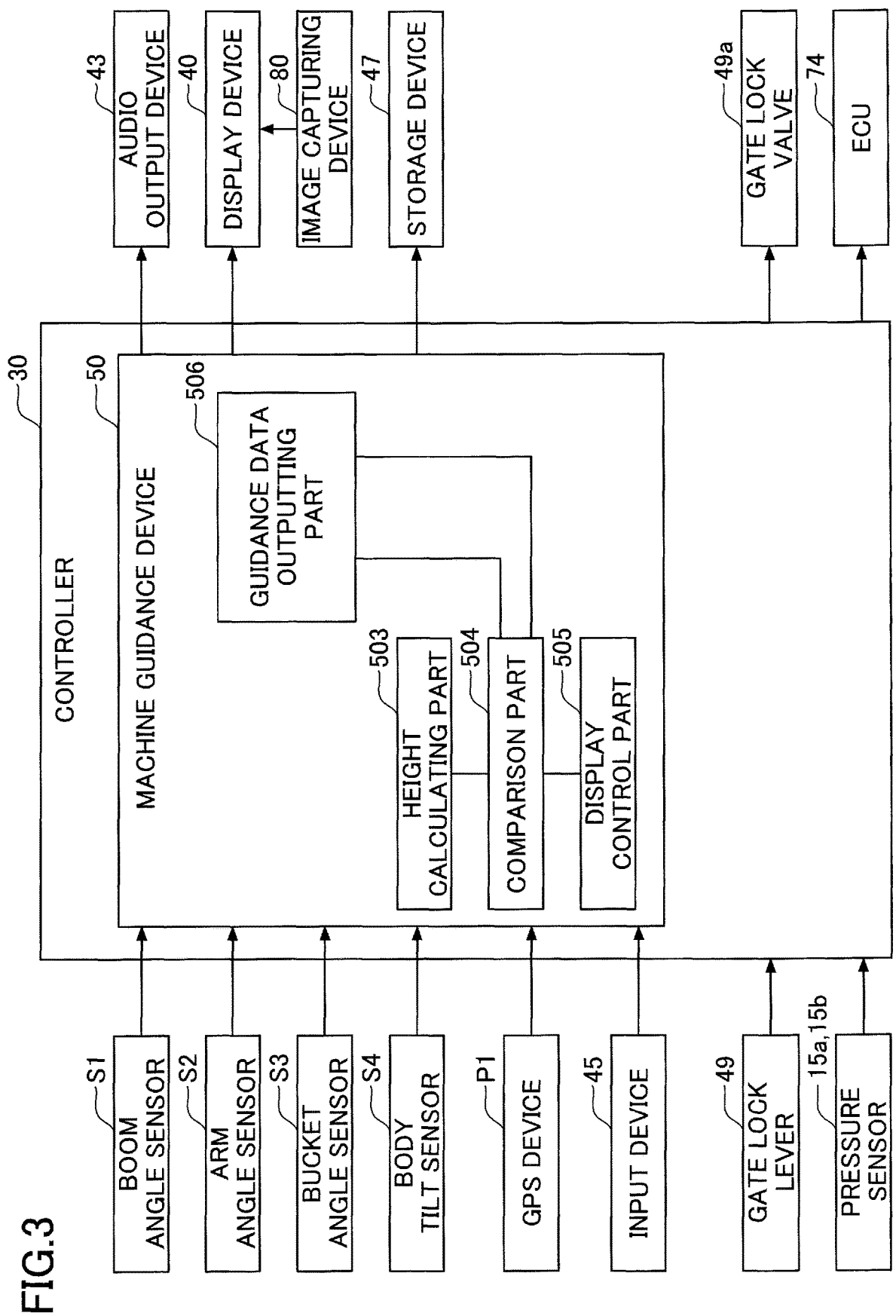
FIG. 3 is a block diagram illustrating an example configuration of a machine guidance device.

Next, various functions provided in the controller 30 and the machine guidance device 50 of the shovel PS are described with reference to FIG. 3. FIG. 3 is a block diagram illustrating an example configuration of the machine guidance device 50.

The controller 30 controls the operation of the entire shovel PS including the ECU 74. The controller 30 performs such control as to close a gate lock valve 49a when the gate lock lever 49 is pushed down and to open the gate lock valve 49a when the gate lock lever 49 is pulled up. The gate lock valve 49a is a selector valve provided in an oil passage between the control valve 17 and the operating levers 26A through 26C, etc. Here, the gate lock valve 49a is configured to be opened or closed based on a command from the controller 30. Alternatively, the gate lock valve 49a may be mechanically connected to the gate lock lever 49 to be opened or closed in response to the operation of the gate lock lever 49.

The gate lock valve 49a is closed to interrupt the flow of hydraulic oil between the control valve 17 and the operating levers 26A through 26C, etc., to disable the operating levers 26A through 26C, etc. The gate lock valve 49a is opened to allow passage of hydraulic oil between the control valve 17 and the operating levers, etc., to enable the operating levers 26A through 26C, etc.

The controller 30 detects the amount of operation of each lever from a pilot pressure detected by the pressure sensor 15a or 15b with the gate lock valve 49a being opened to have the operating levers 26A through 26c enabled.

In addition to controlling the operation of the entire shovel PS, the controller 30 controls whether to give guidance by the machine guidance device 50. Specifically, in response to determining that the shovel is not working, the controller 30 transmits a guidance stop command to the machine guidance device 50 to stop guidance by the machine guidance device 50.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

Next, the machine guidance device 50 is described. The machine guidance device 50 receives various signals and data supplied to the controller 30 from the boom angle sensor S1, the arm angle sensor S2, the bucket angle sensor S3, the body tilt sensor S4, the GPS device P1, the input device 45, etc.

The machine guidance device 50 calculates the actual operating position of the attachment such as the bucket 6 based on the received signals and data. Then, the machine guidance device 50 compares the actual operating position of the attachment and a target work surface, and calculates, for example, the distance between the bucket 6 and the target work surface. The machine guidance device 50 also calculates the distance from the turning central axis of the shovel PS to the teeth tips of the bucket 6, the inclination angle of the target work surface, etc., and transmits these to the display device 40 as work information.

When the machine guidance device 50 and the controller 30 are provided separately, the machine guidance device 50 and the controller 30 are connected through a CAN to be able to communicate with each other.

The machine guidance device 50 includes a height calculating part 503, a comparison part 504, a display control part 505, and a guidance data outputting part 506.

The height calculating part 503 calculates the height of the leading edge (teeth tips) of the bucket 6 from the angles of the boom 4, the arm 5, and the bucket 6 determined from the detection signals of the boom angle sensor S1, the arm angle sensor S2, and the bucket angle sensor S3.

The comparison part 504 compares the height of the leading edge (teeth tips) of the bucket 6 calculated by the height calculating part 503 and the position of the target work surface shown in the guidance data output by the guidance data outputting part 506. Furthermore, the comparison part 504 determines the inclination angle of the target work surface relative to the shovel PS. Various kinds of data determined in the height calculating part 503 and the comparison part 504 are stored in the storage device 47.

The display control part 505 transmits the height of the bucket 6, the inclination angle of the target surface, etc., as determined by the comparison part 504, to the display device 40 as work information. The display device 40 displays the work information transmitted from the display control part 505, together with a captured image transmitted from the image capturing device 80, on the screen. A display screen layout of the display device 40 is described below. Furthermore, in such cases where the bucket 6 is positioned lower than the target work surface, the display control part 505 can issue an alarm to the operator through the audio output device 43.

Figure 4:
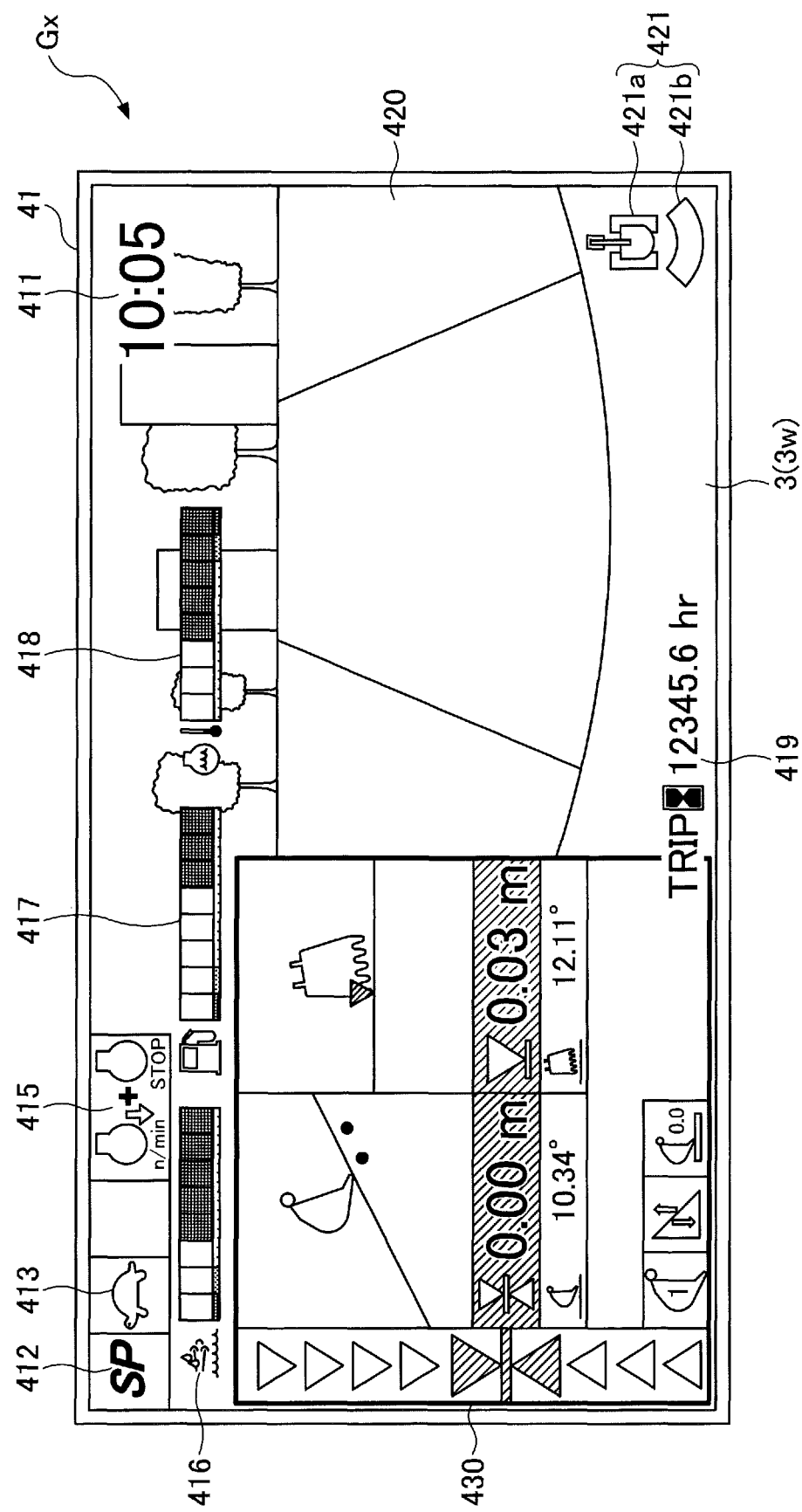
FIG. 4 is a diagram illustrating an example of an output image displayed during a guidance mode.

Next, an example of an output image displayed during a guidance mode is described with reference to FIG. 4. The guidance mode is an operating mode that is selected when executing the machine guidance function or the machine control function. According to this embodiment, the guidance mode starts when a guidance mode button (not depicted) is depressed. The guidance mode is selected, for example, when forming a slope with the shovel PS. FIG. 4 is a diagram illustrating an example of an output image displayed during the guidance mode. According to the illustration of FIG. 4, a reference position and a target work surface are already set.

As illustrated in FIG. 4, an output image Gx displayed on the image display part 41 of the display device 40 includes a time display part 411, a rotational speed mode display part 412, a travel mode display part 413, an engine control status display part 415, a remaining aqueous urea solution amount display part 416, a remaining fuel amount display part 417, a coolant water temperature display part 418, an engine operating time display part 419, a camera image display part 420, and a work guidance display part 430. The rotational speed mode display part 412, the travel mode display part 413, and the engine control status display part 415 are a display part that displays information on the settings of the shovel PS. The remaining aqueous urea solution amount display part 416, the remaining fuel amount display part 417, the coolant water temperature display part 418, and the engine operating time display part 419 are a display part that displays information on the operating condition of the shovel PS. Images displayed in the respective parts are generated by the conversion part 40a of the display device 40, using various kinds of data transmitted from the controller 30 or the machine guidance device 50 and a camera image transmitted from the image capturing device 80.

The time display part 411 displays a current time. According to the illustration of FIG. 4, a digital display is employed, and a current time (10:05) is displayed.

The rotational speed mode display part 412 displays a rotational speed mode set by the engine rotational speed adjustment dial 75 as an image as operating information of the shovel PS. The rotational speed mode includes, for example, the above-described four modes of SP mode, H mode, A mode, and idling mode. According to the illustration of FIG. 4, a symbol "SP" representing the SP mode is displayed.

The travel mode display part 413 displays a travel mode as operating information of the shovel PS. The travel mode represents the setting of traveling hydraulic motors using a variable displacement motor. For example, the travel mode includes a low-speed mode and a high-speed mode. A "turtle"-shaped mark is displayed during the low-speed mode, and a "rabbit"-shaped mark is displayed during the high-speed mode. According to the illustration of FIG. 4, the "turtle"-shaped mark is displayed to make it possible for the operator to recognize that the low-speed mode is set.

The engine control status display part 415 displays the control status of the engine 11 as operating information of the shovel PS. According to the illustration of FIG. 4, "automatic deceleration and automatic stop mode" is selected as the control status of the engine 11. The "automatic deceleration and automatic stop mode" means a control status to automatically reduce the engine rotational speed and further to automatically stop the engine 11 in accordance with the duration of a non-operating condition. Other control statuses of the engine 11 include "automatic deceleration mode," "automatic stop mode," and "manual deceleration mode."

The remaining aqueous urea solution amount display part 416 displays the status of the remaining amount of an aqueous urea solution stored in an aqueous urea solution tank as an image as operating information of the shovel PS. According to the illustration of FIG. 4, a bar gauge representing the current status of the remaining amount of an aqueous urea solution is displayed. The remaining amount of an aqueous urea solution is displayed based on the output data of a remaining aqueous urea solution amount sensor provided in the aqueous urea solution tank.

The remaining fuel amount display part 417 displays the status of the remaining amount of fuel stored in a fuel tank as operating information of the shovel PS. According to the illustration of FIG. 4, a bar gauge representing the current status of the remaining amount of fuel is displayed. The remaining amount of fuel is displayed based on the output data of a remaining fuel amount sensor provided in the fuel tank.

The coolant water temperature display part 418 displays the temperature condition of engine coolant water as operating information of the shovel PS. According to the illustration of FIG. 4, a bar gauge representing the temperature condition of engine coolant water is displayed. The temperature of engine coolant water is displayed based on the output data of the water temperature sensor 11c provided on the engine 11.

The engine operating time display part 419 displays the cumulative operating time of the engine 11 as operating information of the shovel PS. According to the illustration of FIG. 4, a cumulative operating time since the restart of counting by the operator is displayed together with a unit "hr (hour)." A lifelong operating time for the entire period after the manufacture of the shovel or a section operating time since the restart of counting by the operator is displayed in the engine operating time display part 419.

The camera image display part 420 displays an image captured by the image capturing device 80. According to the illustration of FIG. 4, an image captured by the back-side camera 80B attached to the back end of the upper surface of the upper turning body 3 is displayed in the camera image display part 420. A camera image captured by the left-side camera 80L attached to the left end of the upper surface of the upper turning body 3 or the right-side camera 80R attached to the right end of the upper surface of the upper turning body 3 may be displayed in the camera image display part 420. Images captured by two or more of the left-side camera 80L, the right-side camera 80R, and the back-side camera 80B may be displayed side by side in the camera image display part 420. A composite image generated based on multiple camera images captured by at least two of the left-side camera 80L, the right-side camera 80R, and the back-side camera 80B may be displayed in the camera image display part 420. The composite image may be, for example, an overhead view image.

Each camera is installed such that part of the upper turning body 3 is included in the camera image. The operator has a better sense of distance between an object displayed in the camera image display part 420 and the shovel PS because of inclusion of part of the upper turning body 3 in the displayed image.

In the camera image display part 420, a camera icon 421 representing the orientation of the image capturing device 80 that has captured a currently displayed camera image is displayed. The camera icon 421 is composed of a shovel icon 421a representing the shape of the shovel PS and a strip-shaped orientation indicator icon 421b representing the orientation of the image capturing device 80 that has captured the currently displayed camera image. The camera icon 421 is a display part that displays information on the settings of the shovel PS.

According to the illustration of FIG. 4, the orientation indicator icon 421b is displayed below the shovel icon 421a (on the opposite side from the attachment) to indicate that an image of an area behind the shovel PS captured with the back-side camera 80B is displayed in the camera image display part 420. For example, when an image captured by the right-side camera 80R is displayed in the camera image display part 420, the orientation indicator icon 421*b* is displayed to the right of the shovel icon 421*a*. For example, when an image captured by the left-side camera 80L is displayed in the camera image display part 420, the orientation indicator icon 421*b* is displayed to the left of the shovel icon 421*a*.

The operator can switch an image displayed in the camera image display part 420 to an image captured by another camera or the like by depressing an image change switch provided in the cabin 10, for example.

If the shovel PS is not provided with the image capturing device 80, different information may be displayed instead of the camera image display part 420.

Figure 5A:
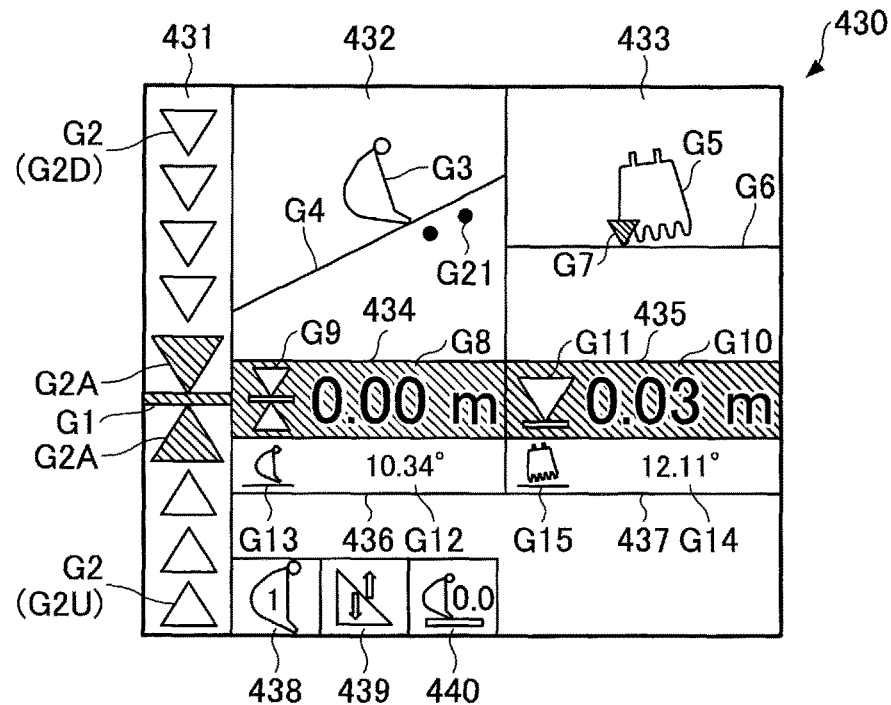
FIG. 5A is a diagram illustrating a first example configuration of a work guidance display part.
Figure 5B:
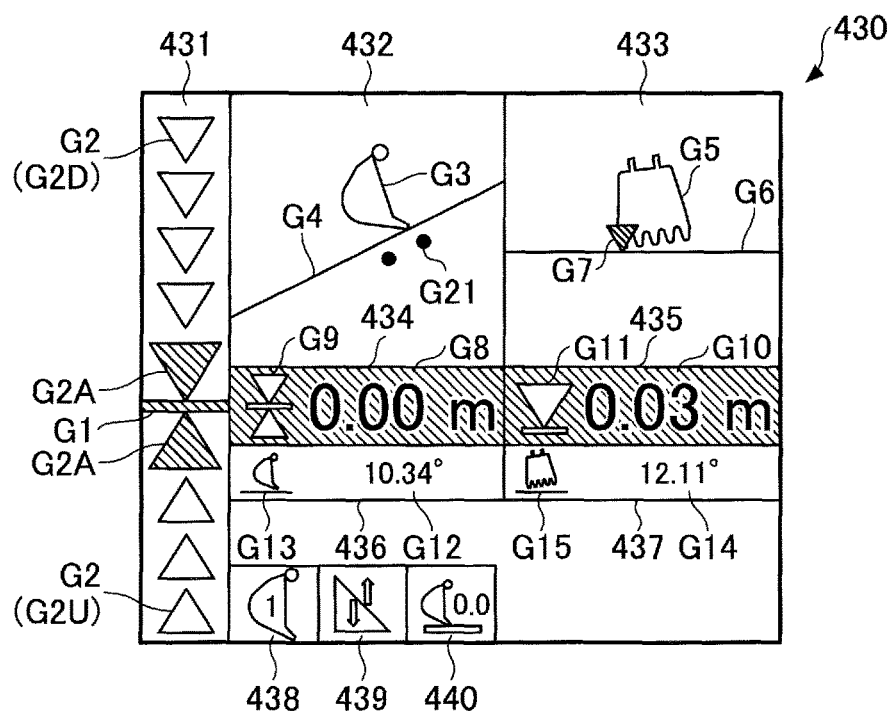
FIG. 5B is a diagram illustrating the first example configuration of the work guidance display part.
Figure 5C:
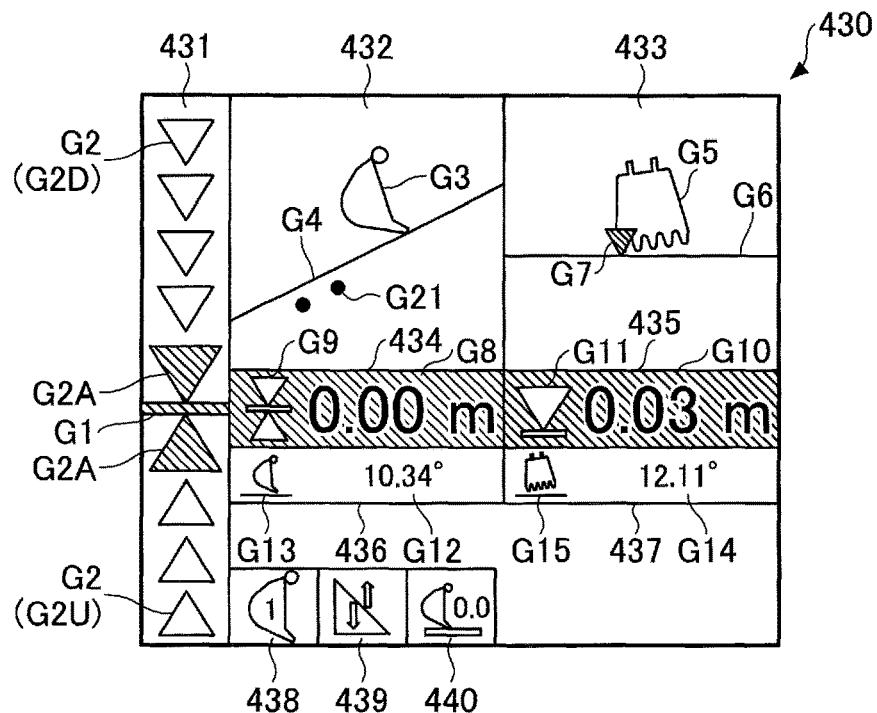
FIG. 5C is a diagram illustrating the first example configuration of the work guidance display part.

The work guidance display part 430 displays guidance information for various kinds of work. FIGS. 5A through 5C are diagrams illustrating a first example configuration of the work guidance display part 430. According to the illustration of FIGS. 5A through 5C, the work guidance display part 430 includes a position indicator image 431, a first target work surface display image 432, a second target work surface display image 433, a bucket left end information image 434, a bucket right end information image 435, a side view numerical value information image 436, a front view numerical value information image 437, an attachment image 438, a distance format image 439, and a target setting image 440, which display teeth tips guidance information that is an example of working part guidance information.

The position indicator image 431 is an example of a first image that represents a change in the size of a relative distance from the working part (leading edge) of the bucket 6 to a target work surface by changing an indicator position based on a change in the display position of the working part (leading edge) of the bucket 6 relative to the display position of the target work surface. According to the illustration of FIGS. 5A through 5C, the position indicator image 431 is a bar gauge of vertically arranged graphics (segments). The position indicator image 431 includes a target segment G1 and multiple segments G2.

The target segment G1 is a graphic representing the position of the target work surface. According to this embodiment, the target segment G1 is a graphic (straight line) indicating that the relative distance from the working part (leading edge) of the bucket 6 to the target work surface is within a predetermined range. The predetermined range is a range preset as an appropriate relative distance range. That the relative distance is within the predetermined range means that the working part of the bucket 6 is at an appropriate position. The target segment G1 is placed at the same height as a second image. The second image represents a change in the size of the distance from the working part of the attachment to the target work surface by changing a display format in the same part. The display format in the same part includes, for example, an icon, a background color, and a numerical value. A change in the display format of the second image is a change in at least one of an icon shape, a color, and a numerical value. According to this embodiment, the second image is a combination of the bucket left end information image 434 and the bucket right end information image 435. The target segment G1 is placed at the same height as each of the bucket left end information image 434 and the bucket right end information image 435. For example, the target segment G1, the bucket left end information image 434, and the bucket right end information image 435 are arranged such that their respective vertical centers are at the same height.

Each segment G2 is a graphic corresponding to a predetermined relative distance. A segment G2 corresponding to a smaller relative distance is placed closer to the target segment G1. A segment G2 corresponding to a greater relative distance is placed farther from the target segment G1. Each segment G2 represents the direction of movement of the bucket 6 as well as the relative distance. The direction of movement of the bucket 6 is a direction to move the working part of the bucket 6 toward the target work surface. According to this embodiment, a segment G2D indicates that the bucket 6 is moved downward to approach the target work surface, and a segment G2U indicates that the bucket 6 is moved upward to approach the target work surface.

The position indicator image 431 displays a segment G2 corresponding to the actual relative distance from the working part (leading edge) of the bucket 6 to the target work surface in a predetermined color different from the color of the other segments G2. The segment G2 displayed in a color different from the color of the other segments G2 is referred to as a segment G2A. The position indicator image 431 indicates the relative distance and the direction of movement by displaying the segment G2A in a predetermined color. As the relative distance from the working part (leading edge) of the bucket 6 to the target work surface becomes greater, a segment G2 more distant from the target segment G1 is displayed in a predetermined color as the segment G2A. As the relative distance from the working part (leading edge) of the bucket 6 to the target work surface becomes smaller, a segment G2 closer to the target segment G1 is displayed in a predetermined color as the segment G2A. Thus, the segment G2A is so displayed as to vertically change the position as the relative distance changes.

When the relative distance is greater than the maximum value of the predetermined range, the segment G2A is displayed in a first color. The first color is, for example, an inconspicuous color such as white or yellow. This is because when the relative distance is greater than the maximum value of the predetermined range, there is little need to alert the operator. Furthermore, when the relative distance is within the predetermined range, the segment G2A is displayed in a second color. The second color is a conspicuous color such as green. This is for notifying the operator that the bucket 6 is at an appropriate position in an easy-to-understand manner. Furthermore, when the relative distance is smaller than the minimum value of the predetermined range, the segment G2A is displayed in a third color. The third color is a conspicuous color such as red. This is for alerting the operator that the target work surface may be excessively scraped by the working part of the bucket 6.

When the actual relative distance of the bucket 6 is within the predetermined range, the position indicator image 431 displays the target segment G1 in a predetermined color different from the color of the other segments. That is, the position indicator image 431 indicates that the relative distance is within the predetermined range by displaying the target segment G1 in a predetermined color. The target segment G1 is preferably displayed in the above-described second color. This is for notifying the operator that the bucket 6 is at an appropriate position in an easy-to-understand manner.

While the segment G2A and the target segment G1 are displayed in a predetermined color, the other segments G2 may be displayed in an inconspicuous color (color equal or similar to a background color) or may not be displayed.

The first target work surface display image 432 schematically shows the relationship between the bucket 6 and the target work surface. In the first target work surface display image 432, the bucket 6 and the target work surface as viewed from the side are schematically shown by a bucket icon G3 and a target work surface image G4 that serve as a first graphic. The bucket icon G3 is a graphic that represents a left side surface 61 (see FIG. 1) of the bucket 6. The bucket icon G3 may alternatively be a graphic that represents the right side surface of the bucket 6 or be shown in the shape of the bucket 6 as viewed from the side. The target work surface image G4 is a graphic representing the ground as the target work surface, and is shown in the shape of the ground as the target work surface as viewed from the side. The target work surface image G4 may be displayed with the angle formed between a line segment representing the target work surface and a horizontal line in a vertical plane longitudinally intersecting the bucket 6 (which is a target slope angle θ and is hereinafter referred to as "longitudinal inclination angle"). The vertical interval between the bucket icon G3 and the target work surface image G4 is so displayed as to change as the actual distance between the leading edge of the bucket 6 and the target work surface changes. Likewise, the relative inclination angle between the bucket icon G3 and the target work surface image G4 is so displayed as to change as the actual relative inclination angle between the bucket 6 and the target work surface changes. According to this embodiment, the display height and display angle of the target work surface image G4 change with the bucket icon G3 being fixed. Alternatively, the display height and display angle of the bucket icon G3 may change with the target work surface image G4 being fixed, or the display height and display angle of each of the bucket icon G3 and the target work surface image G4 may change.

The first target work surface display image 432 schematically shows the actual movement of the bucket 6. In the first target work surface display image 432, the forward or backward movement of the bucket 6 as viewed from the side is schematically shown by the relative positions of the bucket icon G3 and an animation icon G21 serving as a second graphic. The animation icon G21 is set at a preset position relative to the target work surface image G4. The position of the animation icon G21 changes according to the actual forward or backward movement (for example, travel distance and travel speed) of the bucket 6. According to the illustration of FIGS. 5A through 5C, the animation icon G21 is displayed below the target work surface image G4, and is a graphic represented by two dots (points) of the same size. According to this embodiment, when the bucket 6 moves toward the operator (backward), the animation icon G21 moves forward in a direction opposite to the moving direction of the bucket 6, for example, toward the bottom left along the target work surface image G4. As a result, the position of the bucket icon G3 relative to the animation icon G21 moves backward. Therefore, the operator can easily recognize that the bucket 6 is moving toward the operator (backward). Furthermore, when the bucket 6 moves away from the operator (forward), the animation icon G21 moves backward in a direction opposite to the moving direction of the bucket 6, for example, toward the top right along the target work surface image G4. As a result, the position of the bucket icon G3 relative to the animation icon G21 moves forward. Therefore, the operator can easily recognize that the bucket 6 is moving away from the operator (forward). Furthermore, because the animation icon G21 is set at a preset position relative to the target work surface image G4, the relative relationship between the bucket icon G3 and the animation icon G21 is equal to the relative relationship between the bucket 6 and a point on the actual ground. Therefore, when the bucket 6 moves fast, the animation icon G21 on the screen also moves fast. Furthermore, when the animation icon 21 moves to the end (for example, left end) of the screen to disappear from the screen as the bucket 6 moves, the next animation icon G21 appears at the opposite end (for example, right end) of the screen. The next animation icon G21, however, may appear at any time, for example, before the animation icon G21 disappears from the screen.

According to the illustration of FIGS. 5A through 5C, the animation icon G21 moves toward the bottom left along the target work surface image G4 in order of FIG. 5A to FIG. 5B to FIG. 5C. Therefore, the operator can recognize that the bucket 6 is moving toward the operator (backward). The animation icon G21 may be a graphic represented by one dot or three or more dots, for example. When the animation icon G21 is represented by multiple dots, the dots may be equal in size or include dots of different sizes. Furthermore, multiple graphics each represented by one dot or three or more dots may be simultaneously displayed. In this case, the graphics are displayed at intervals along the target work surface image G4, for example.

Figure 6A:
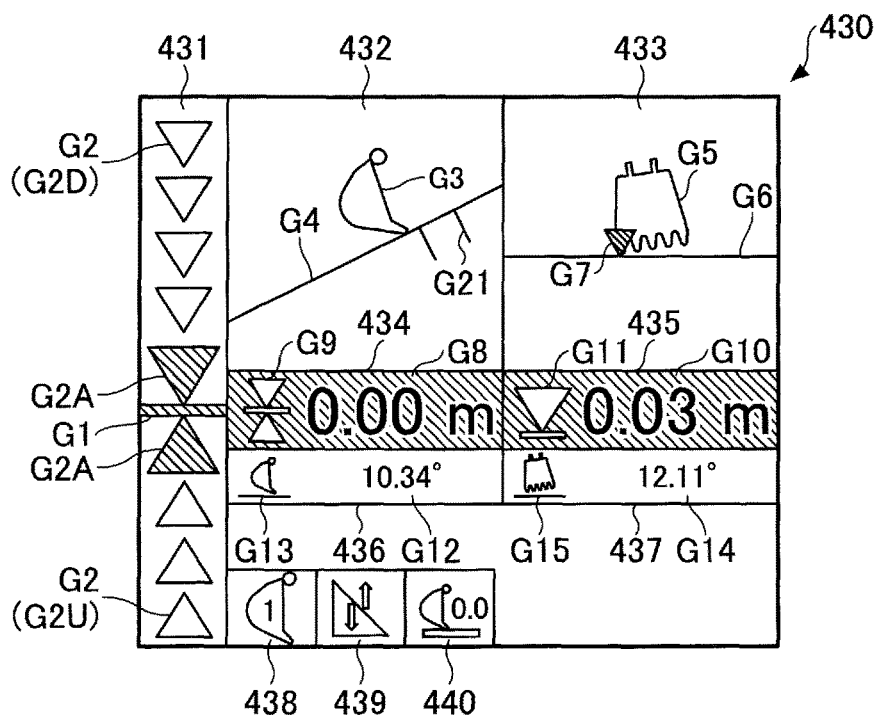
FIG. 6A is a diagram illustrating a second example configuration of the work guidance display part.
Figure 6B:
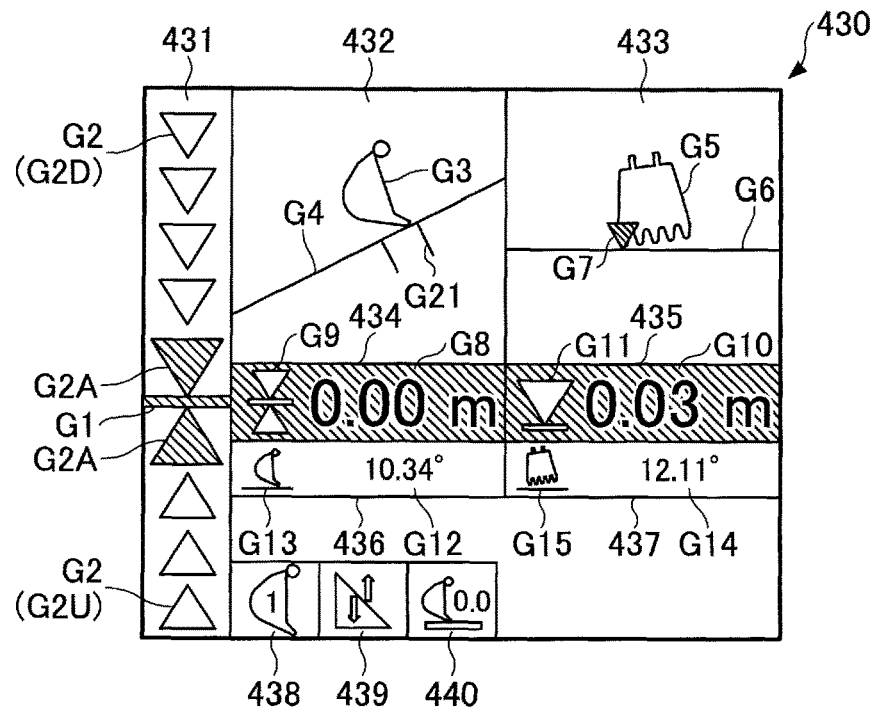
FIG. 6B is a diagram illustrating the second example configuration of the work guidance display part.
Figure 6C:
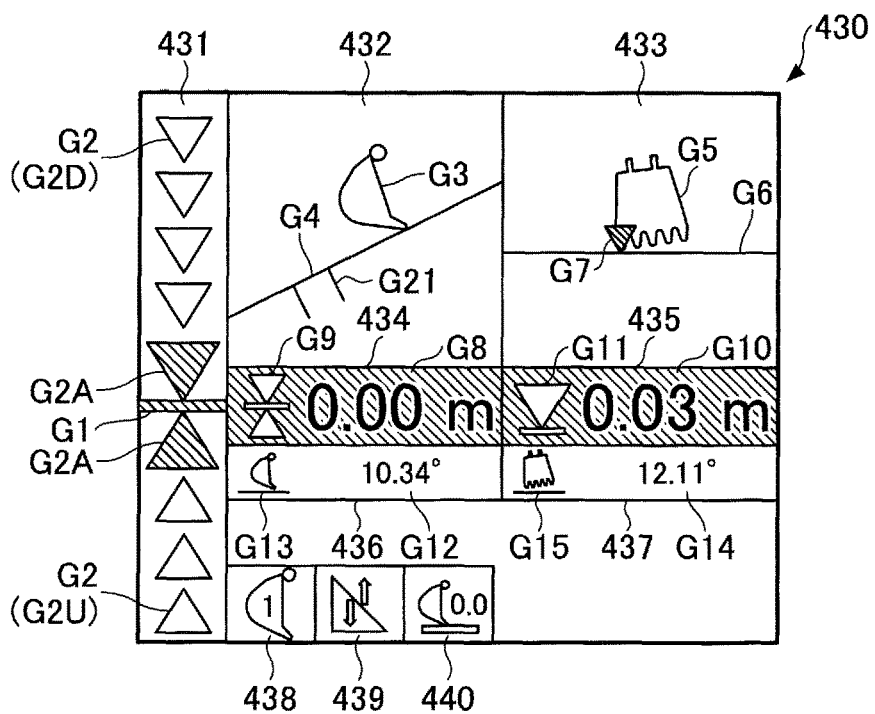
FIG. 6C is a diagram illustrating the second example configuration of the work guidance display part.

The animation icon G21 may be a graphic represented by one or more lines. FIGS. 6A through 6C are diagrams illustrating a second example configuration of the work guidance display part 430. According to the illustration of FIGS. 6A through 6C, the animation icon G21 is a graphic represented by two lines extending downward from the target work surface image G4. According to the illustration of FIGS. 6A through 6C, the animation icon G21 moves toward the bottom left along the target work surface image G4 in order of FIG. 6A to FIG. 6B to FIG. 6C. Therefore, the operator can recognize that the bucket 6 is moving toward the operator (backward). The animation icon G21 may be a graphic represented by one line or three or more lines, for example. When the animation icon G21 is represented by multiple lines, the lines may be equal in length or include lines of different lengths. Furthermore, multiple graphics each represented by one line or three or more lines may be simultaneously displayed. In this case, the graphics are displayed at intervals along the target work surface image G4, for example.

Figure 7A:
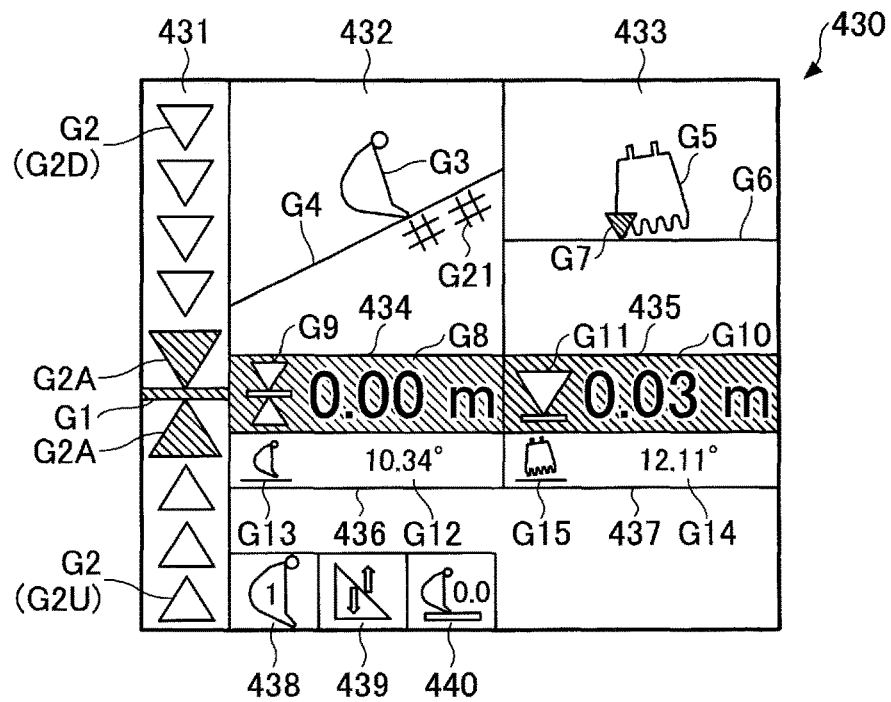
FIG. 7A is a diagram illustrating a third example configuration of the work guidance display part.
Figure 7B:
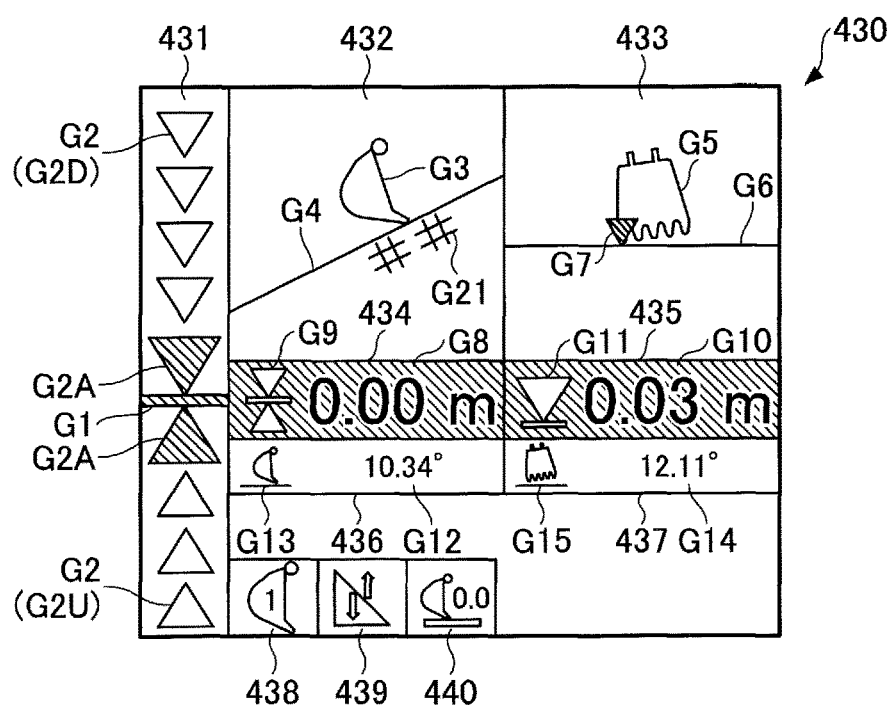
FIG. 7B is a diagram illustrating the third example configuration of the work guidance display part.
Figure 7C:
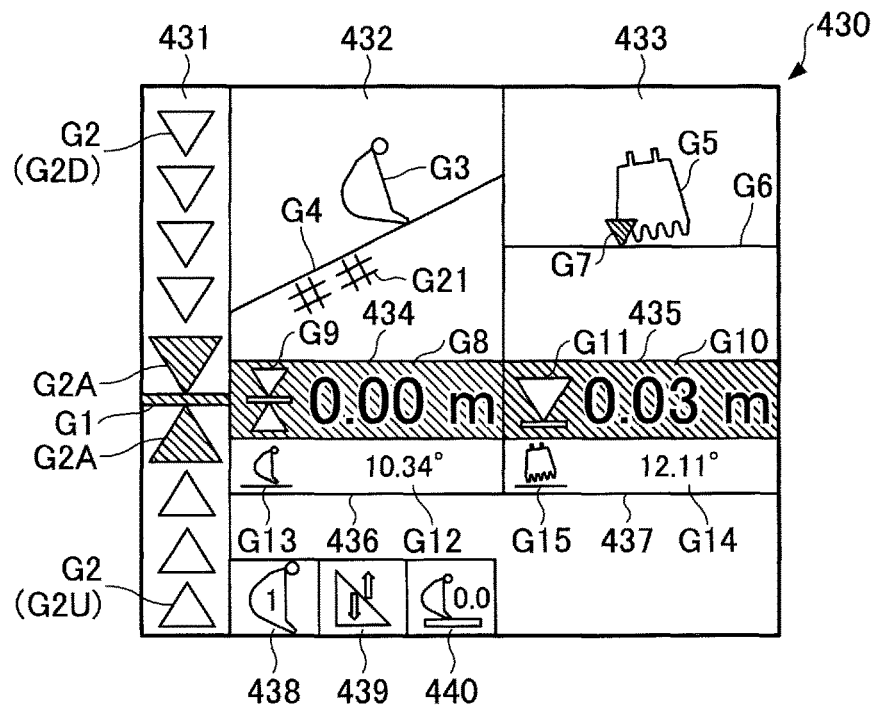
FIG. 7C is a diagram illustrating the third example configuration of the work guidance display part.

The animation icon G21 may be a graphic represented by a mesh (hatching). FIGS. 7A through 7C are diagrams illustrating a third example configuration of the work guidance display part 430. According to the illustration of FIGS. 7A through 7C, the animation icon G21 is displayed below the target work surface image G4, and is a graphic represented by two meshes of the same size. According to the illustration of FIGS. 7A through 7C, the animation icon G21 moves toward the bottom left along the target work surface image G4 in order of FIG. 7A to FIG. 7B to FIG. 7C. Therefore, the operator can recognize that the bucket 6 is moving toward the operator (backward). The animation icon G21 may be a graphic represented by one mesh or three or more meshes, for example. When the animation icon G21 is represented by multiple meshes, the meshes may be equal in size or include meshes of different sizes. Furthermore, multiple graphics each represented by one mesh or three or more meshes may be simultaneously displayed. In this case, the graphics are displayed at intervals along the target work surface image G4, for example.

Furthermore, the animation icon G21 may be any combination of the graphics illustrated in FIGS. 5A through 5C, FIGS. 6A through 6C, and FIGS. 7A through 7C, or be a different graphic.

Furthermore, the animation icon G21 may be a graphic that represents the actual forward or backward moving direction of the bucket 6 (for example, an arrow). In this case, the animation icon G21 blinks according to the actual forward or backward movement (for example, travel distance and travel speed) of the bucket 6. For example, when the bucket 6 moves fast, the animation icon G21 on the screen also blinks fast.

By looking at the first target work surface display image 432 configured as described above, the operator can understand the positional relationship between the bucket 6 and the target work surface, the approximate longitudinal inclination angle of the target work surface, and the forward or backward movement of the bucket 6. In the first target work surface display image 432, the target work surface image G4 may be displayed with an inclination angle that is greater than actually is in order to improve visibility for the operator.

The second target work surface display image 433 schematically shows the relationship between the bucket 6, the target work surface, and the working part. In the second target work surface display image 433, the bucket 6, the target work surface, and the working part as viewed by the operator seated in the cabin 10 and looking forward from the shovel PS are schematically shown by a bucket icon G5 serving as a first graphic, a target work surface image G6, and a working part image G7. The bucket icon G5 is a graphic that represents a front surface 6f of the bucket 6 (see FIG. 1). The bucket icon G5 may alternatively be a graphic that represents a back surface 6b of the bucket 6 (see FIG. 1) or be shown in the shape of the bucket 6 as viewed by the operator seated in the cabin 10 and looking forward from the shovel PS. The target work surface image G6 is a graphic that represents the ground as a target work surface, and is shown in the shape of the ground as viewed by the operator seated in the cabin 10 and looking forward from the shovel PS. The target work surface image G6 may be displayed with the angle formed between a line segment representing the target work surface and a horizontal line in a vertical plane transversely intersecting the bucket 6 (which is a target slope angle θ and is hereinafter referred to as "transverse inclination angle"). The working part image G7 is a graphic that indicates the working part of the bucket 6. The working part is part of the leading edge of the bucket 6 selected by the operator. The operator may select the left end (tooth tip at the left end), the right end (tooth tip at the right end), the center (central tooth tip), etc., of the leading edge of the bucket 6 as the working part. The "right and left" here refers to the right and left as viewed by the operator seated in the cabin 10 and looking forward from the shovel PS. According to the illustration of FIGS. 5A through 5C, the left end of the bucket 6 is selected as the working part. Therefore, the working part image G7 is displayed over the left end of the leading edge of the bucket icon G5. The vertical interval between the bucket icon G5 and the target work surface image G6 is so displayed as to change as the actual distance between the leading edge of the bucket 6 and the target work surface changes. Likewise, the relative inclination angle between the bucket icon G5 and the target work surface image G6 is so displayed as to change as the actual relative inclination angle between the bucket 6 and the target work surface changes. The working part image G7 corresponds to the position indicator image 431. Specifically, the distance between the target work surface image G6 and the working part image G7 corresponds to the distance between the target segment G1 and the segment G2A in the position indicator image 431.

Figure 8A:
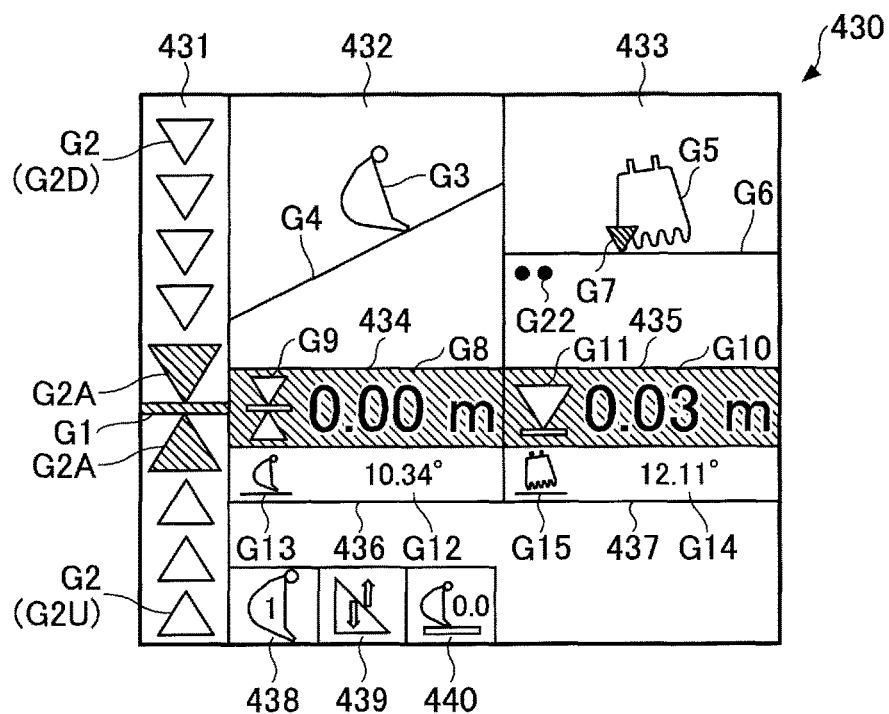
FIG. 8A is a diagram illustrating a fourth example configuration of the work guidance display part.
Figure 8B:
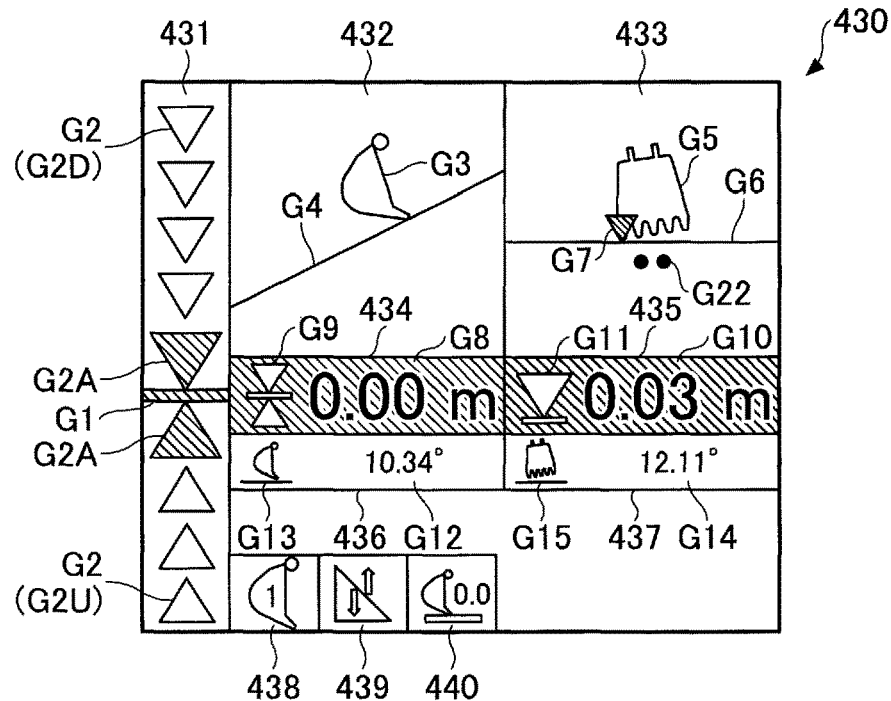
FIG. 8B is a diagram illustrating the fourth example configuration of the work guidance display part.
Figure 8C:
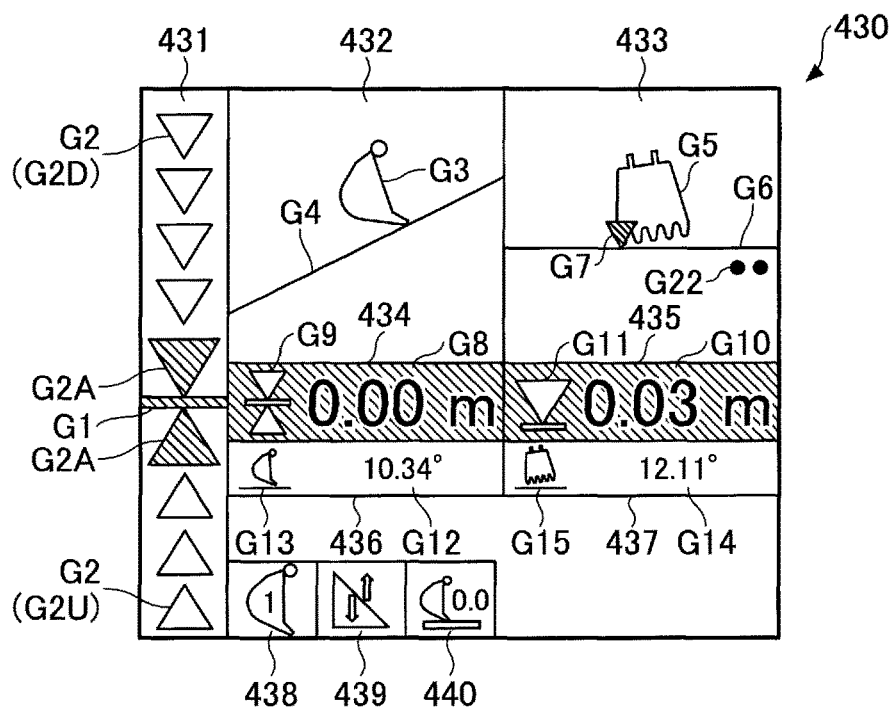
FIG. 8C is a diagram illustrating the fourth example configuration of the work guidance display part.

The second target work surface display image 433 schematically shows the actual movement of the bucket 6. In the second target work surface display image 433, the rightward or leftward movement of the bucket 6 as viewed by the operator seated in the cabin 10 and looking forward from the shovel PS is schematically shown by the relative positions of the bucket icon G5 and an animation icon G22 serving as a second graphic. The animation icon G22 is set at a preset position relative to the target work surface image G6. The position of the animation icon G22 changes according to the actual rightward or leftward movement (for example, travel distance and travel speed) of the bucket 6. FIGS. 8A through 8C are diagrams illustrating a fourth example configuration of the work guidance display part 430. According to the illustration of FIGS. 8A through 8C, the animation icon G22 is displayed below the target work surface image G6, and is a graphic represented by two dots (points) of the same shape. According to this embodiment, when the bucket 6 moves leftward because of the turning of the upper turning body 3, the animation icon G22 moves in a direction opposite to the turning direction of the upper turning body 3, for example, rightward along the target work surface image G6. As a result, the position of the bucket icon G5 relative to the animation icon G22 moves leftward. Therefore, the operator can easily recognize that the bucket 6 is moving leftward. Furthermore, when the bucket 6 moves rightward because of the turning of the upper turning body 3, the animation icon G22 moves in a direction opposite to the turning direction of the upper turning body 3, for example, leftward along the target work surface image G6. As a result, the position of the bucket icon G5 relative to the animation icon G22 moves rightward. Therefore, the operator can easily recognize that the bucket 6 is moving rightward. Furthermore, because the animation icon G22 is set at a preset position relative to the target work surface image G6, the relative relationship between the bucket icon G5 and the animation icon G22 is equal to the relative relationship between the bucket 6 and a point on the actual ground. Therefore, when the bucket 6 moves fast, the animation icon G22 on the screen also moves fast. Furthermore, when the animation icon 22 moves to the end (for example, right end) of the screen to disappear from the screen as the bucket 6 moves, the next animation icon G22 appears at the opposite end (for example, left end) of the screen. The next animation icon G22, however, may appear at any time, for example, before the animation icon G22 disappears from the screen.

According to the illustration of FIGS. 8A through 8C, the animation icon G22 moves rightward along the target work surface image G6 in order of FIG. 8A to FIG. 8B to FIG. 8C. Therefore, the operator can recognize that the bucket 6 is moving leftward. The animation icon G22 is not limited to the graphic illustrated in FIGS. 8A through 8C, and may be various graphics. For example, the animation icon G22 may be the same graphics as those of the animation icon G21 illustrated in FIGS. 5A through 5C, FIGS. 6A through 6C, and FIGS. 7A through 7C.

Furthermore, the animation icon G22 may be a graphic that represents the actual rightward or leftward moving direction of the bucket 6 (for example, an arrow). In this case, the animation icon G22 blinks according to the actual rightward or leftward movement (for example, travel distance and travel speed) of the bucket 6. For example, when the bucket 6 moves fast, the animation icon G22 on the screen also blinks fast.

By looking at the second target work surface display image 433 configured as described above, the operator can understand the positional relationship between the bucket 6 and the target work surface, the approximate transverse inclination angle of the target work surface, and the rightward or leftward movement of the bucket 6.

The bucket left end information image 434 serving as the second image shows the distance between the left end of the leading edge of the bucket 6 and the target work surface. According to the illustration of FIGS. 5A through 5C, the bucket left end information image 434 is displayed under the first target work surface display image 432. The bucket left end information image 434 shows a left end distance G8 and a direction icon G9. The left end distance G8 is a numerical value that indicates the distance between the left end of the leading edge of the bucket 6 and the target work surface. When the left end of the leading edge of the bucket 6 is positioned above the target work surface, the left end distance G8 is shown as a positive value. When the left end of the leading edge of the bucket 6 is positioned below the target work surface, the left end distance G8 is shown as a negative value. According to the illustration of FIGS. 5A through 5C, the left end distance G8 is 0.00 m. The operator can know the exact left end distance by looking at the left end distance G8 numerically shown in the bucket left end information image 434. The direction icon G9 is a graphic that indicates the direction of movement of the bucket 6. The direction of movement of the bucket 6 is a direction to move the left end of the leading edge of the bucket 6 toward the target work surface. According to the illustration of FIGS. 5A through 5C, the left end of the leading edge of the bucket 6 is positioned at the target work surface. Therefore, a graphic of the same shape as the two segments G2A and the target segment G1 is displayed as the direction icon G9. The background color of the direction icon G9 and the bucket left end information image 434 is so displayed as to change according as the left end distance G8 changes.

The bucket right end information image 435 serving as the second image shows the distance between the right end of the leading edge of the bucket 6 and the target work surface. According to the illustration of FIGS. 5A through 5C, the bucket right end information image 435 is displayed to the right of and adjoining to the bucket left end information image 434 under the second target work surface display image 433. That is, the bucket left end information image 434 and the bucket right end information image 435 are displayed at the same height. The bucket right end information image 435 shows a right end distance G10 and a direction icon G11. The right end distance G10 is a numerical value that indicates the distance between the right end of the leading edge of the bucket 6 and the target work surface. When the right end of the leading edge of the bucket 6 is positioned above the target work surface, the right end distance G10 is shown as a positive value. When the right end of the leading edge of the bucket 6 is positioned below the target work surface, the right end distance G10 is shown as a negative value. According to the illustration of FIGS. 5A through 5C, the right end distance G10 is different from the value of the left end distance G8, and is 0.34 m. This is because the leading edge of the bucket 6 is inclined to the target work surface according to the illustration of FIGS. 5A through 5C. The operator can know the exact right end distance by looking at the right end distance G10 numerically shown in the bucket right end information image 435. The direction icon G1*l* is a graphic indicating the direction of movement of the bucket 6. The direction of movement of the bucket 6 is a direction to move the right end of the leading edge of the bucket 6 toward the target work surface. According to the illustration of FIGS. 5A through 5C, the right end of the leading edge of the bucket 6 is positioned above the target work surface, and the relative distance from the right end of the leading edge of the bucket 6 to the target work surface is within the predetermined range. Therefore, a graphic of the same shape as the segment G2A and the target segment G1 is displayed as the direction icon G11. The background color of the direction icon G11 and the bucket right end information image 435 is so displayed as to change according as the right end distance G10 changes.

Specifically, the background of the bucket left end information image 434 is displayed in a first color when the left end distance G8 is greater than the maximum value of the predetermined range. The first color is, for example, an inconspicuous color such as white or yellow. This is because when the left end distance G8 is greater than the maximum value of the predetermined range, there is little need to alert the operator. Furthermore, the background of the bucket left end information image 434 is displayed in a second color when the left end distance G8 is within the predetermined range. The second color is a conspicuous color such as green. This is for notifying the operator that the left end of the leading edge of the bucket 6 is at an appropriate position in an easy-to-understand manner. Furthermore, the background of the bucket left end information image 434 is displayed in a third color when the left end distance G8 is smaller than the minimum value of the predetermined range. The third color is a conspicuous color such as red. This is for alerting the operator that the target work surface may be excessively scraped by the left end of the leading edge of the bucket 6. The same applies to the bucket right end information image 435.

The side view numerical value information image 436 shows the relationship between the bucket 6 and the target work surface as viewed from the side. According to the illustration of FIGS. 5A through 5C, the side view numerical value information image 436 is displayed under the bucket left end information image 434. The side view numerical value information image 436 shows a longitudinal bucket angle G12 and a longitudinal bucket icon G13. The longitudinal bucket angle G12 is a numerical value that indicates the relative angle between the back surface 6*b* of the bucket 6 and the target work surface in a vertical plane longitudinally intersecting the bucket 6. According to the illustration of FIGS. 5A through 5C, the longitudinal bucket angle G12 is 10.34°. The operator can know the exact longitudinal bucket angle by looking at the value of the longitudinal bucket angle G12 numerically shown in the side view numerical value information image 436. The longitudinal bucket icon G13 is a graphic that schematically represents the longitudinal bucket angle G12. The longitudinal bucket icon G13 is displayed, for example, in the shape of the bucket 6 and the target work surface as viewed from the side of the bucket 6 with reference to the target work surface. According to this embodiment, the inclination of the bucket portion of the longitudinal bucket icon G13 is shown at three levels of inclination. The three levels of inclination show that the longitudinal bucket angle G12 is a positive value, zero, and a negative value. Alternatively, the inclination of the bucket portion of the longitudinal bucket icon G13 may be fixed or may be so displayed as to change as the longitudinal bucket angle G12 changes.

The front view numerical value information image 437 shows the relationship between the bucket 6 and the target work surface as viewed by the operator seated in the cabin 10 and looking forward from the shovel PS. According to the illustration of FIGS. 5A through 5C, the front view numerical value information image 437 is displayed to the right of and adjoining to the side view numerical value information image 436 under the bucket right end information image

435. The front view numerical value information image 437 shows a transverse bucket angle G14 and a transverse bucket icon G15. The transverse bucket angle G14 is a numerical value that indicates the relative angle between the teeth tips line of the bucket 6 and the target work surface in a vertical plane transversely intersecting the bucket 6. According to the illustration of FIGS. 5A through 5C, the transverse bucket angle G14 is 12.11°. The operator can know the exact transverse bucket angle by looking at the value of the transverse bucket angle G14 numerically shown in the front view numerical value information image 437. The transverse bucket icon G15 is a graphic that schematically represents the transverse bucket angle G14. The transverse bucket icon G15 is displayed, for example, in the shape of the bucket 6 and the target work surface as viewed by the operator seated in the cabin 10 and looking forward from the shovel PS with reference to the target work surface. According to this embodiment, the inclination of the bucket portion of the transverse bucket icon G15 is shown at three levels of inclination the same as in the case of the longitudinal bucket icon G13. The three levels of inclination show that the transverse bucket angle G14 is a positive value, zero, and a negative value. Alternatively, the inclination of the bucket portion of the transverse bucket icon G15 may be fixed or may be so displayed as to change as the transverse bucket angle G14 changes.

The attachment image 438 is an image that represents an attachment that is attached. According to the illustration of FIGS. 5A through 5C, the attachment image 438 is displayed at the lower end of the work guidance display part 430. Various end attachments such as the bucket 6, a rock drill, a grapple, and a lifting magnet are attachable to the shovel PS. The attachment image 438 shows, for example, marks shaped like these end attachments and numbers corresponding to the end attachments. The numbers of the end attachments are registered in advance. According to the illustration of FIGS. 5A through 5C, the attachment image 438 indicates that the bucket 6 corresponding to #1 is attached as an end attachment. When a rock drill is attached as an end attachment, for example, a rock drill-shaped mark is shown together with a number corresponding to a rock drill in the attachment image 438.

The distance format image 439 is an image that represents the display format of the left end distance G8 shown in the bucket left end information image 434 and the right end distance G10 shown in the bucket right end information image 435. According to the illustration of FIGS. 5A through 5C, the distance format image 439 is displayed to the right of and adjoining to the attachment image 438 at the lower end of the work guidance display part 430. The left end distance G8 and the right end distance G10 are displayed in, for example, either a vertical distance display format or a normal distance display format. The vertical distance is a distance in a vertical direction relative to the target work surface. The normal distance is a distance in a normal direction relative to the target work surface. The operator can choose the display format of the left end distance G8 and the right end distance G10 between the vertical distance display format and the normal distance display format. The left end distance G8 and the right end distance G10 are displayed in the display format chosen by the operator. The distance format image 439 shows a mark representing the display format chosen by the operator. According to the illustration of FIGS. 5A through 5C, the left end distance G8 and the right end distance G10 are displayed in the vertical distance display format.

The target setting image 440 is an image that indicates whether the target value and the target work surface have been set. According to the illustration of FIGS. 5A through 5C, the target setting image 440 is displayed to the right of and adjoining to the distance format image 439 at the lower end of the work guidance display part 430. The target setting image 440 shows a mark corresponding to whether the target value and the target work surface have been set. According to the illustration of FIGS. 5A through 5C, the target setting image 440 shows that the target value and the target work surface have been set.

As described above, according to the shovel PS of the embodiment of the present invention, the positions of the animation icons G21 and G22 shown in the first target work surface display image 432 and/or the second target work surface display image 433 move according to the actual movement of the bucket 6. This enables the operator to easily understand the movement (for example, travel direction and travel speed) of the bucket 6 by looking at the work guidance display part 430. That is, visibility is improved.

An embodiment of the present invention is described above. The above description, however, does not limit the present invention, and various variations and modifications may be made within the scope of the present invention.

For example, according to the above-described embodiment, the case where the first target work surface display image 432 or the second target work surface display image 433 schematically shows the actual movement of the bucket 6 is illustrated as an example, while the present invention is not limited to this. For example, the first target work surface display image 432 and the second target work surface display image 433 may schematically show the actual movement of the bucket 6.

The shovel PS may include another display device 40S independent of the display device 40. For example, the same as the display device 40, the display device 40S includes a conversion part that generates an image for display based on the output of the controller 30 or the machine guidance device 50. For example, the display device 40S is attached to an attachment stay vertically extending upward from the floor of the cabin 10. The display device 40 may be, for example, a monitor that displays a main screen, an information display and setting screen, etc. The display device 40S may be, for example, a monitor dedicated to functions using ICT, such as a machine guidance function and a machine control function. However, the display device 40 may display information associated with functions using ICT, such as a machine guidance function and a machine control function, and the display device 40S may display a main screen, an information display and setting screen, etc.

Figure 10:
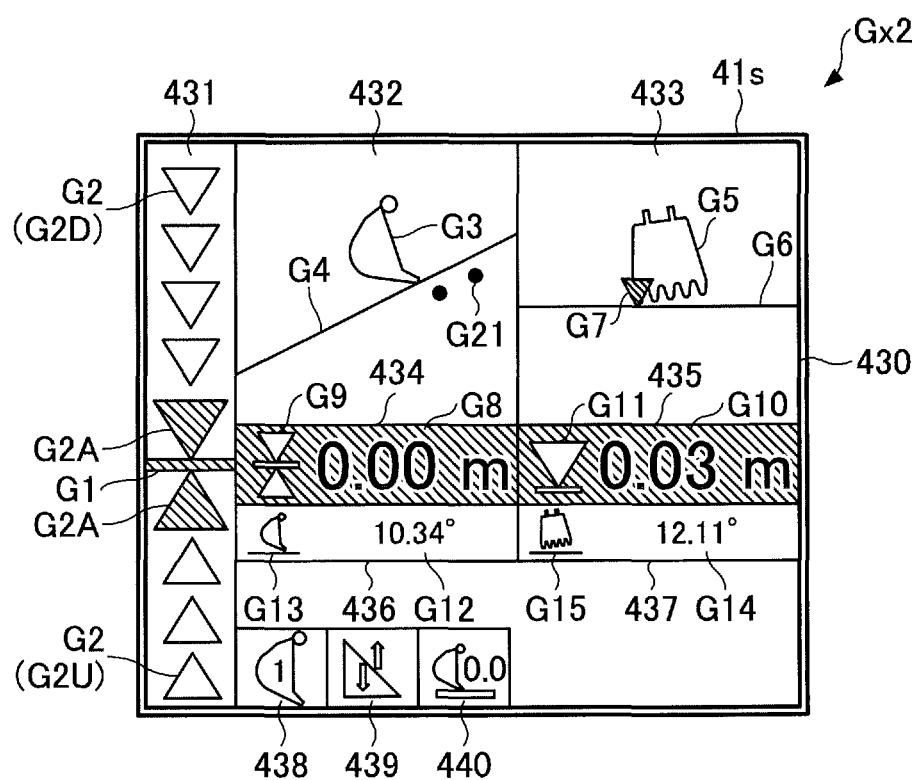
FIG. 10 is a diagram illustrating an example layout of an output image displayed on another display device during the measurement mode.

FIG. 9 is a diagram illustrating an example layout of an output image displayed on the display device 40 during a measurement mode. FIG. 10 is a diagram illustrating an example layout of an output image displayed on the other display device 40S during the measurement mode.

According to the illustration of FIGS. 9 and 10, the display device 40 displays a main screen, an information display and setting screen, etc., and the display device 40S displays information associated with functions using ICT, such as a machine guidance function and a machine control function.

Specifically, as illustrated in FIG. 9, an output image Gx1 displayed on the image display part 41 of the display device 40 includes the time display part 411, the rotational speed mode display part 412, the travel mode display part 413, an attachment display part 414, the engine control status display part 415, the remaining aqueous urea solution amount display part 416, the remaining fuel amount display part 417, the coolant water temperature display part 418, the engine operating time display part 419, the camera image display part 420, an average fuel efficiency display part 441, and a hydraulic oil temperature display part 442. As illustrated in FIG. 10, an output image Gx2 displayed on an image display part 41s of the display device 40S includes the work guidance display part 430.

What is claimed is:

1. A shovel comprising:
   a lower traveling body;
   an upper turning body turnably mounted on the lower traveling body;
   a cab mounted on the upper turning body;
   an attachment attached to the upper turning body; and
   a display device provided in the cab, the display device being configured to display an image including a first graphic and a second graphic, the first graphic representing a relative relationship between a working part of the attachment and a target work surface, the second graphic changing a position thereof according to a movement of the working part,
   wherein the first graphic includes a straight line representing the target work surface and a graphic representing the working part,
   the second graphic is initially set at a preset position relative to the straight line, and
   as the working part moves, a position of the second graphic moves along the straight line on an opposite side of the straight line from the graphic representing the working part while a position of the graphic representing the working part remains unchanged with respect to a forward or backward movement or a rightward or leftward movement of the working part.

2. The shovel as claimed in claim 1, wherein the position of the second graphic moves in a direction opposite to a direction in which the working part moves.

3. The shovel as claimed in claim 1, wherein when the second graphic disappears from one end of a screen of the display device, a next second graphic appears from another end of the screen of the display device.

4. The shovel as claimed in claim 1, wherein
   the graphic representing the working part is a graphic representing a side surface of the working part, and
   a display height and a display angle of the graphic representing the side surface of the working part change while a position of the straight line representing the target work surface is at a fixed position.

5. The shovel as claimed in claim 1, wherein
   the graphic representing the working part is a graphic representing a side surface of the working part, and
   a display height and a display angle of the straight line representing the target work surface change while the graphic representing the side surface of the working part is at a fixed position.

6. The shovel as claimed in claim 1, wherein the second graphic is displayed below the target work surface.

7. The shovel as claimed in claim 1, wherein
   the first graphic includes the graphic representing the working part and the straight line representing the target work surface as viewed from a side, and
   the position of the second graphic moves according to the forward or backward movement of the working part.

8. The shovel as claimed in claim 1, wherein
   the first graphic includes the graphic representing the working part and the straight line representing the target work surface in a forward looking view, and
   the position of the second graphic moves according to a turning movement of the upper turning body.

9. The shovel as claimed in claim 1, wherein the second graphic includes a dot, a line segment, hatching, or any combination thereof.

10. The shovel as claimed in claim 1, wherein multiple graphics are simultaneously displayed as the second graphic.

11. The shovel as claimed in claim 1, wherein the second graphic blinks according to the movement of the working part.

12. The shovel as claimed in claim 11, wherein the second graphic is a graphic representing a direction in which the working part moves.

13. The shovel as claimed in claim 1, wherein
   the straight line representing the target work surface is displayed together with an inclination angle formed between the straight line and a horizontal line.

14. A display device for a shovel, the shovel including an attachment, wherein:
   the display device is configured to display an image including a first graphic and a second graphic, the first graphic representing a relative relationship between a working part of the attachment and a target work surface, the second graphic changing a position thereof according to a movement of the working part,
   the first graphic includes a straight line representing the target work surface and a graphic representing the working part,
   the second graphic is initially set at a preset position relative to the straight line, and
   as the working part moves, a position of the second graphic moves along the straight line on an opposite side of the straight line from the graphic representing the working part while a position of the graphic representing the working part remains unchanged with respect to a forward or backward movement or a rightward or leftward movement of the working part.

15. A display method for a shovel, the shovel including an attachment, the display method comprising:
   displaying an image including a first graphic and a second graphic, the first graphic representing a relative relationship between a working part of the attachment and a target work surface, the second graphic changing a position thereof according to a movement of the working part,
   wherein the first graphic includes a straight line representing the target work surface and a graphic representing the working part,
   the second graphic is initially set at a preset position relative to the straight line, and
   as the working part moves, a position of the second graphic moves along the straight line on an opposite side of the straight line from the graphic representing the working part while a position of the graphic representing the working part remains unchanged with respect to a forward or backward movement or a rightward or leftward movement of the working part.

16. The shovel as claimed in claim 1, wherein
   the display device is configured to display the graphic representing the working part and the straight line representing the target work surface in such a manner as to represent the relative relationship between the working part and the target work surface, and to display the second graphic such that the position of the second graphic moves along the straight line representing the target work surface in a direction opposite to a direction in which the working part moves while the working part moves relative to the target work surface.

* * * * *